(12) United States Patent
Chigasaki

(10) Patent No.: US 7,640,557 B2
(45) Date of Patent: Dec. 29, 2009

(54) HOUSING FOR ON-VEHICLE ELECTRONIC APPARATUS

(75) Inventor: Hiroyuki Chigasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1033 days.

(21) Appl. No.: 11/203,107

(22) Filed: Aug. 15, 2005

(65) Prior Publication Data

US 2006/0039671 A1     Feb. 23, 2006

(30) Foreign Application Priority Data

Aug. 20, 2004     (JP) ............................. 2004-241358

(51) Int. Cl.
*G11B 33/02* (2006.01)
(52) U.S. Cl. ..................................... 720/647
(58) Field of Classification Search ................. 720/646, 720/647
See application file for complete search history.

(56) References Cited

U.S. PATENT DOCUMENTS

| | | | | |
|---|---|---|---|---|
| 6,377,451 B1 * | 4/2002 | Furuya | ................... | 361/679.32 |
| 6,398,168 B1 * | 6/2002 | O'Tae | ........................ | 248/27.3 |
| 6,411,583 B1 * | 6/2002 | Yamamoto et al. | .......... | 720/647 |

FOREIGN PATENT DOCUMENTS

| | | |
|---|---|---|
| JP | 1-174788 | 12/1989 |
| JP | 1-302797 | 12/1989 |
| JP | 2-92900 | 7/1990 |
| JP | 2000-285663 | 10/2000 |
| JP | 2002-166790 | 6/2002 |
| JP | 2003-237487 | 8/2003 |

* cited by examiner

*Primary Examiner*—David D Davis
(74) *Attorney, Agent, or Firm*—Oblon, Spivak, McClelland, Maier & Neustadt, L.L.P.

(57) ABSTRACT

A housing for an on-vehicle electronic apparatus includes a housing body, and a front panel assembly detachably attached to the front surface of the housing body. A recording medium insertion slit is provided in an upper portion of the front surface of the housing body. When a finger is put on the portion of an upper panel portion and the upper panel portion is pushed downwards, an upper member is moved downwards, and a lower member is swung to the front side about an axis according to the vertical movement of the upper member. When the upper panel portion reaches a lower position and a lower panel portion reaches a slant position, the spacing between an opening and an upper wall of the upper panel portion is enlarged, and the recording medium insertion slit is opened, resulting in the condition where a recording medium can be inserted or removed.

20 Claims, 23 Drawing Sheets

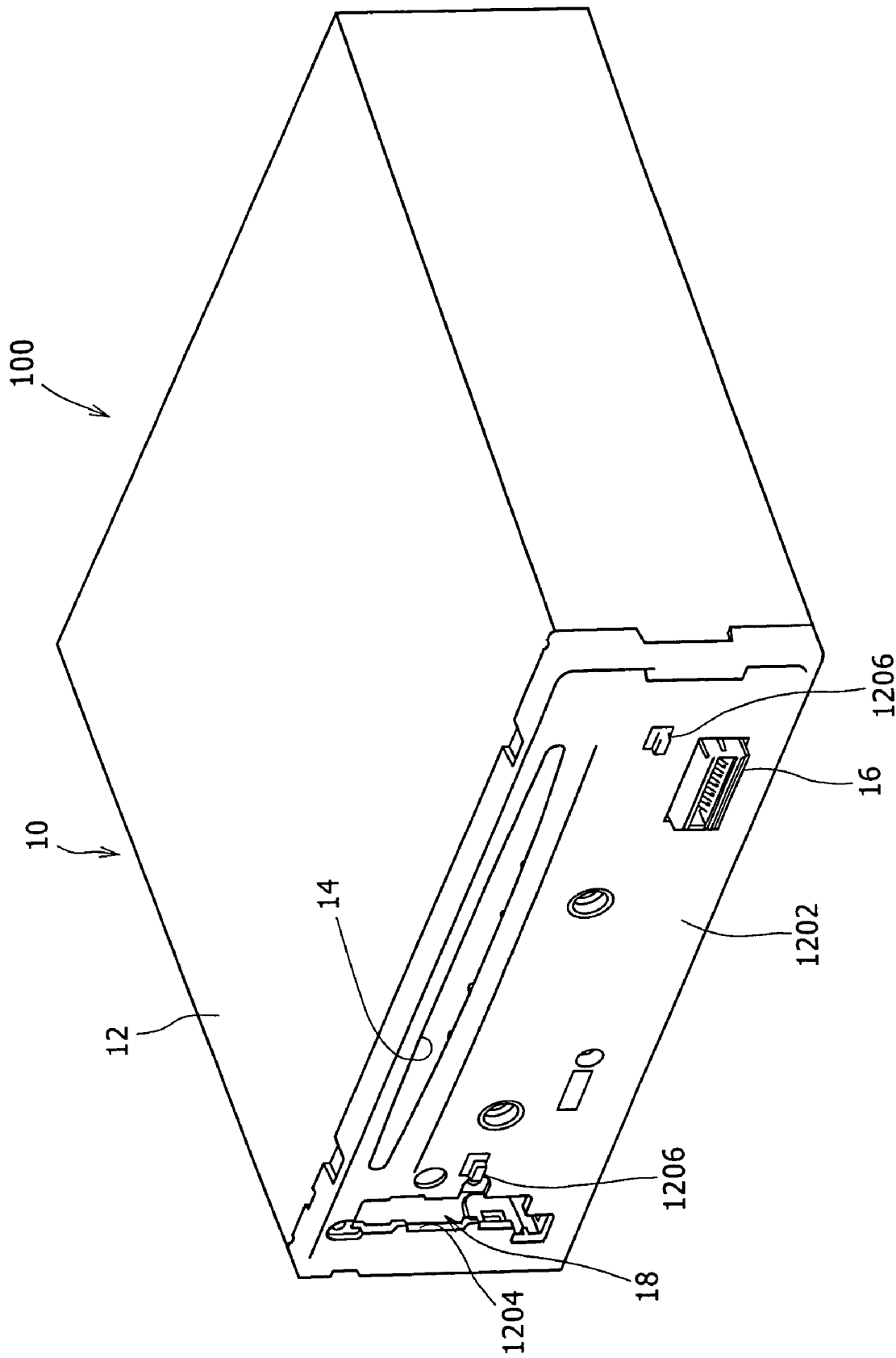

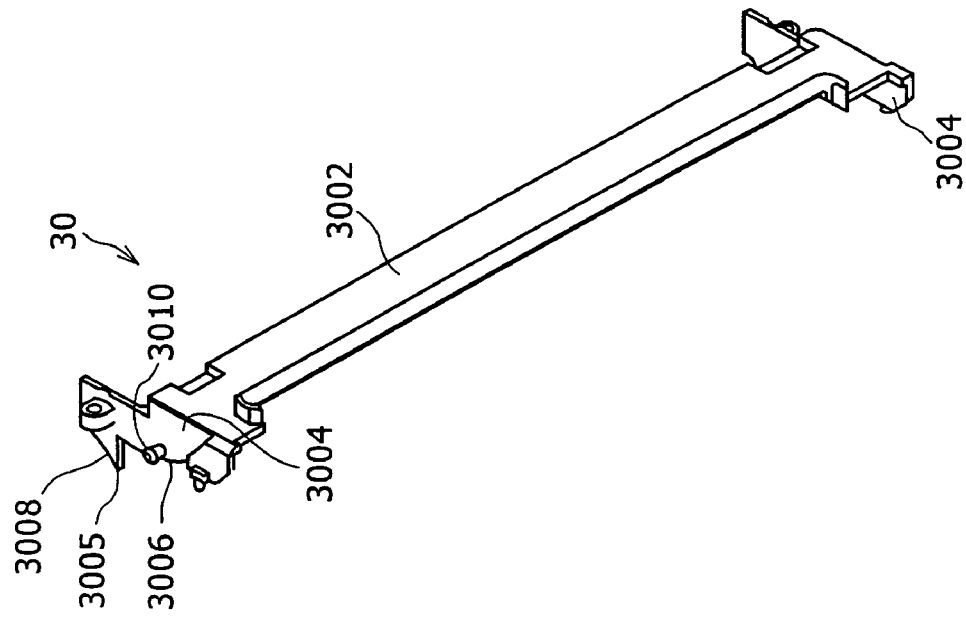
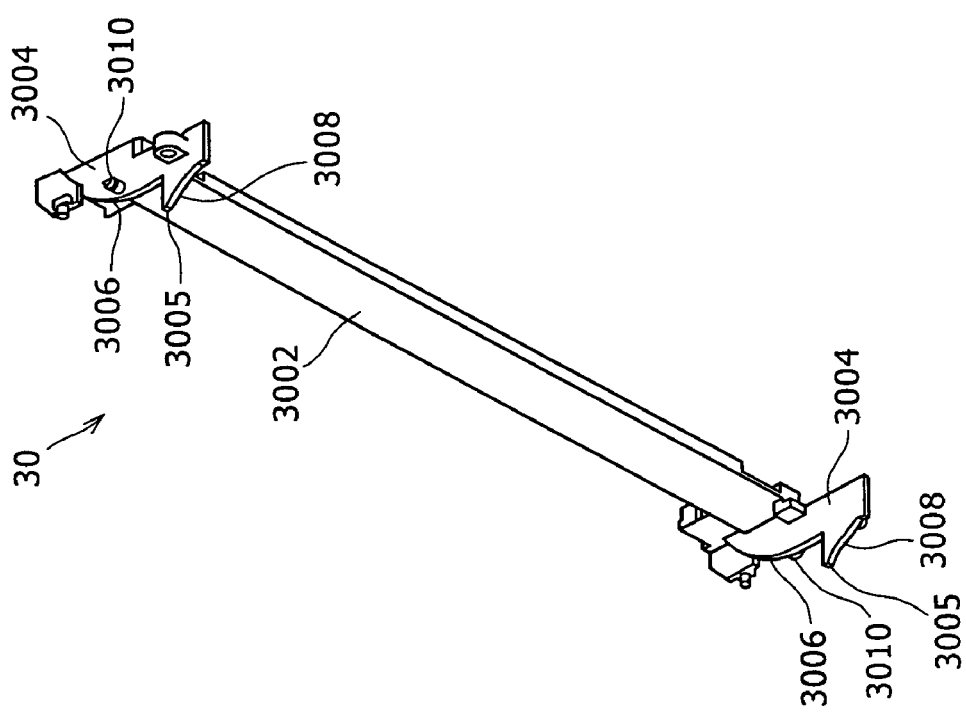

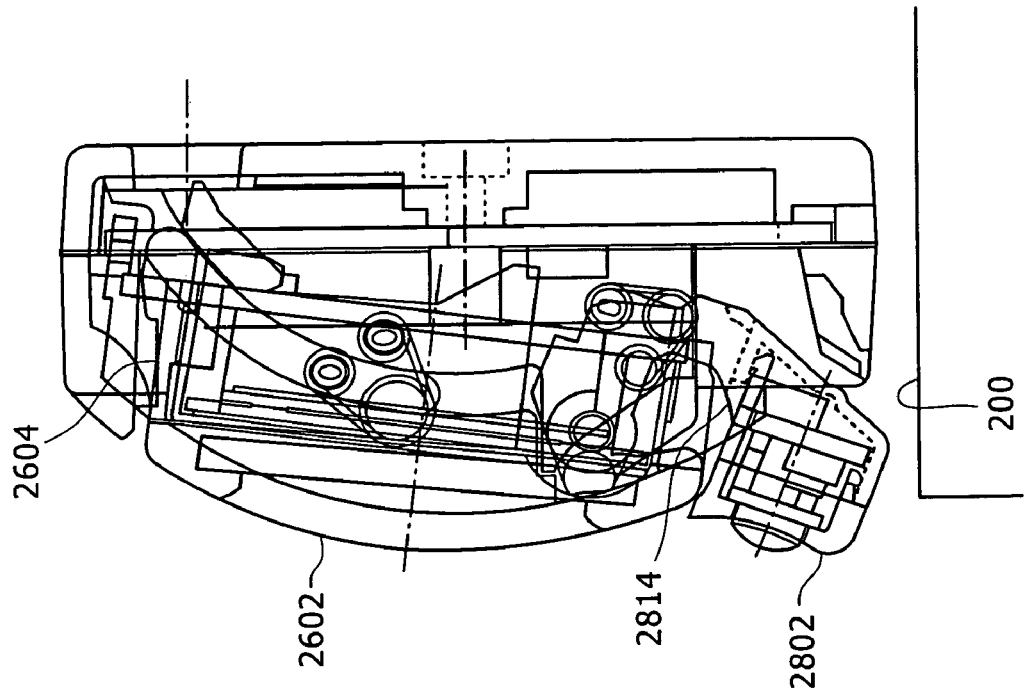
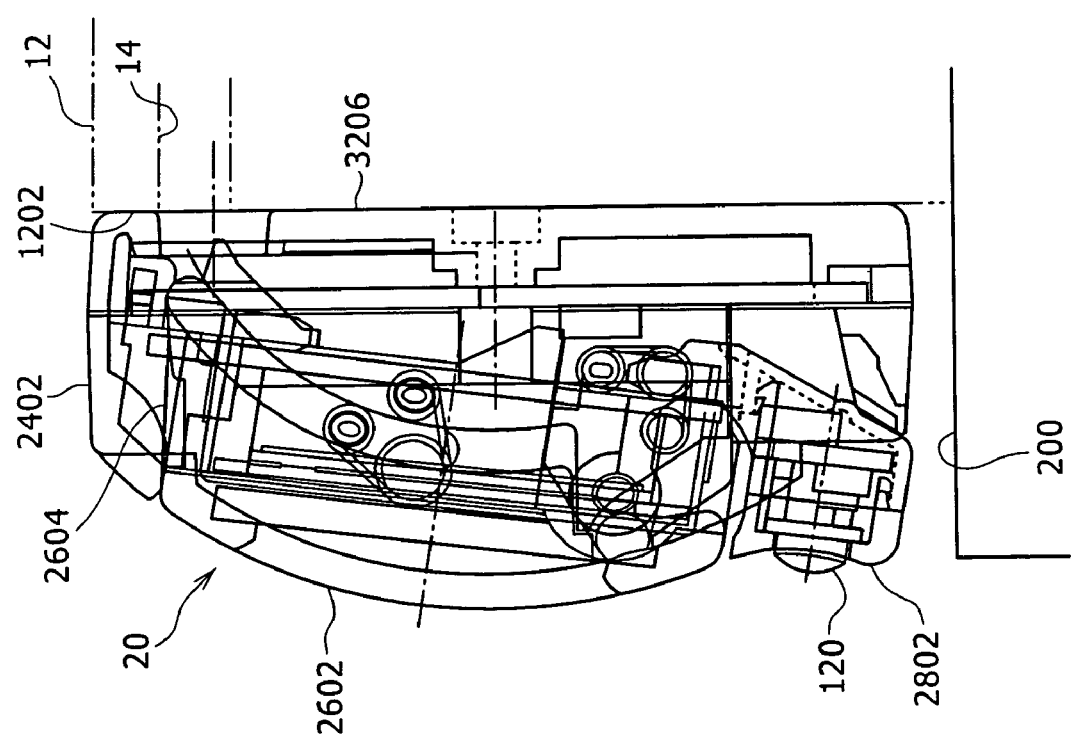

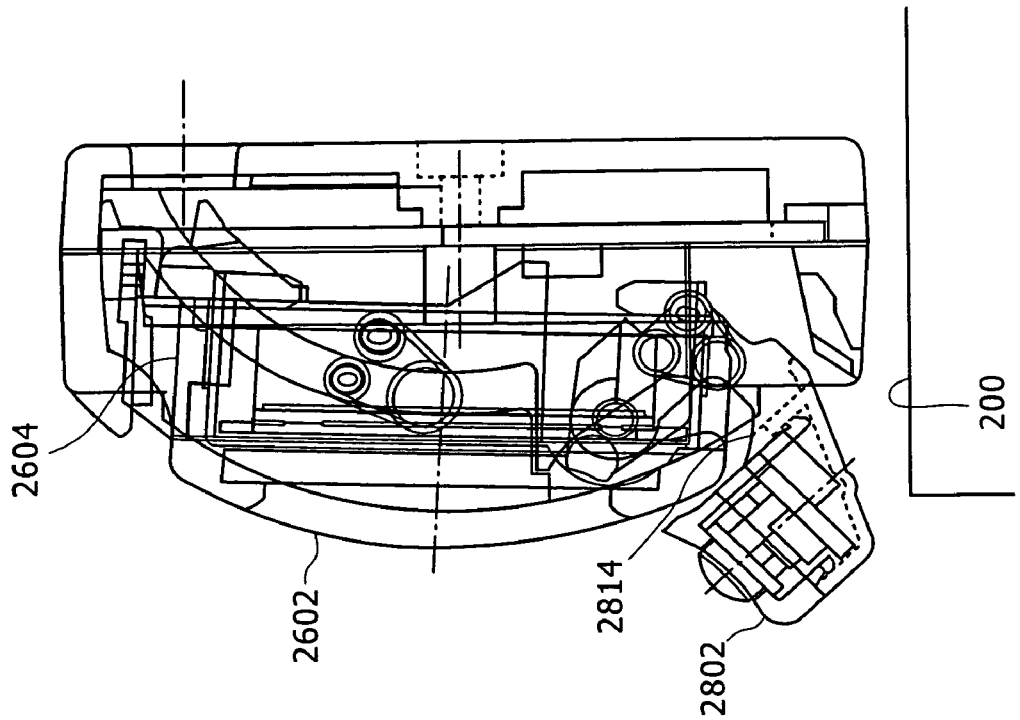
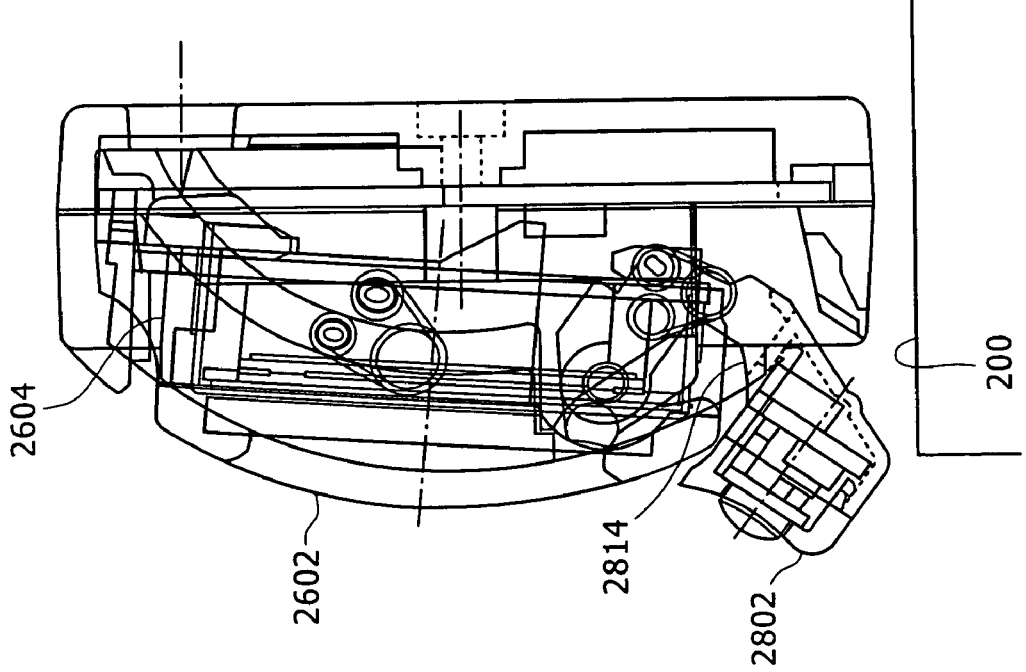

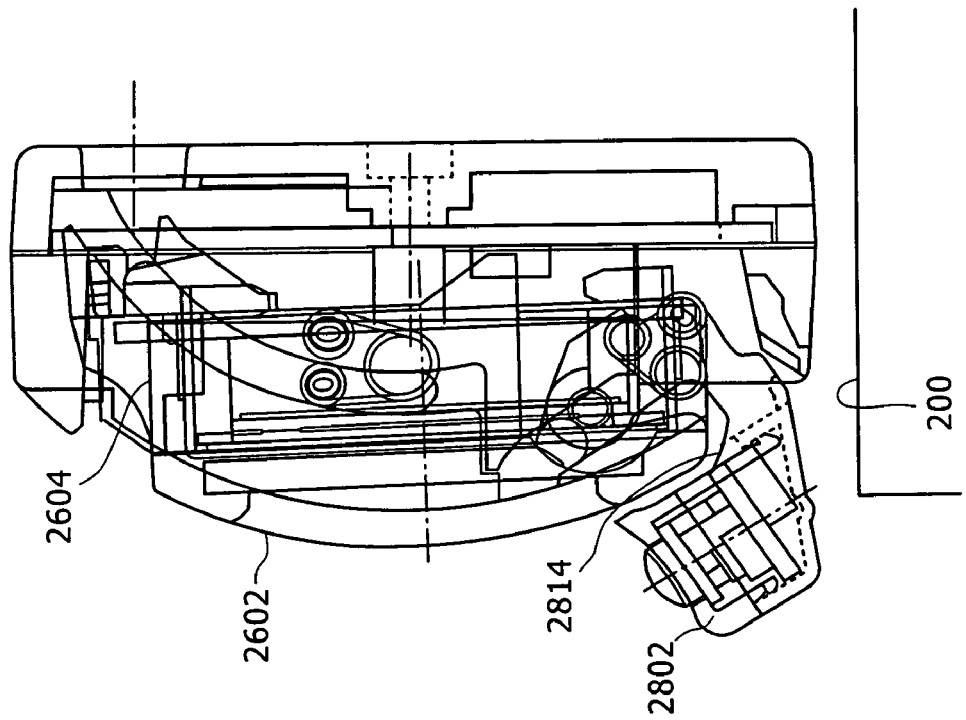
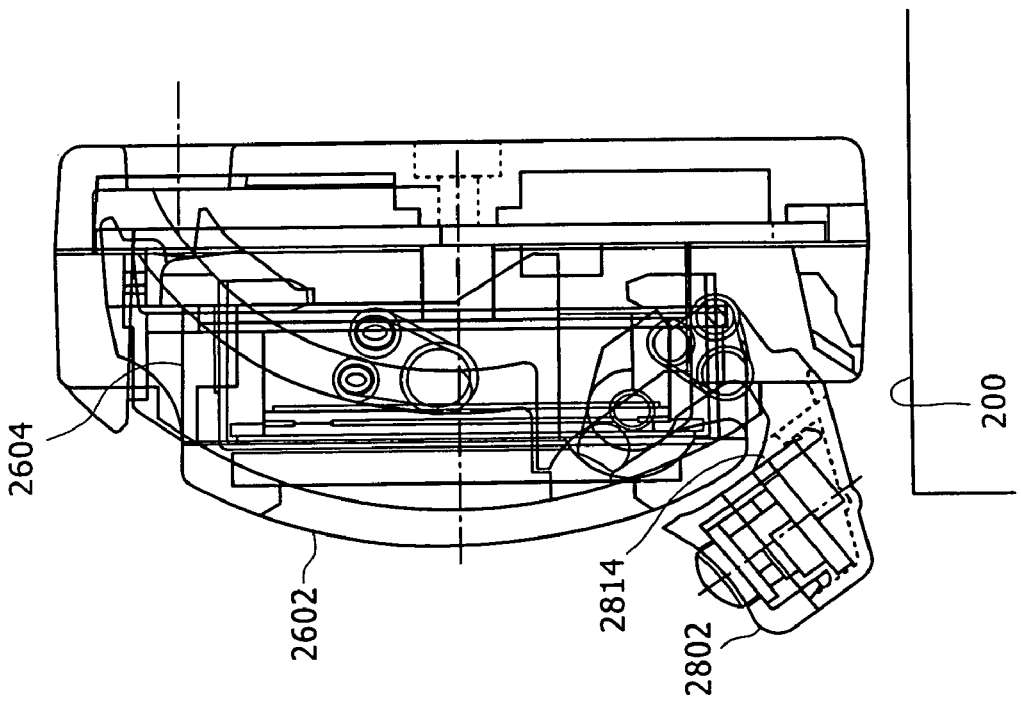

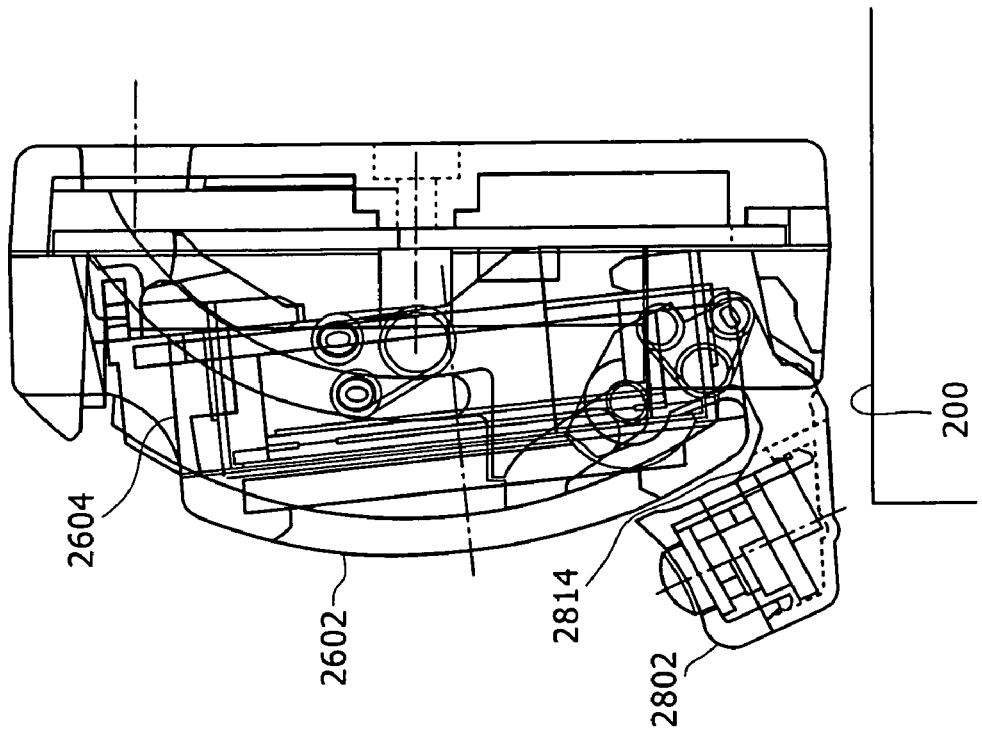
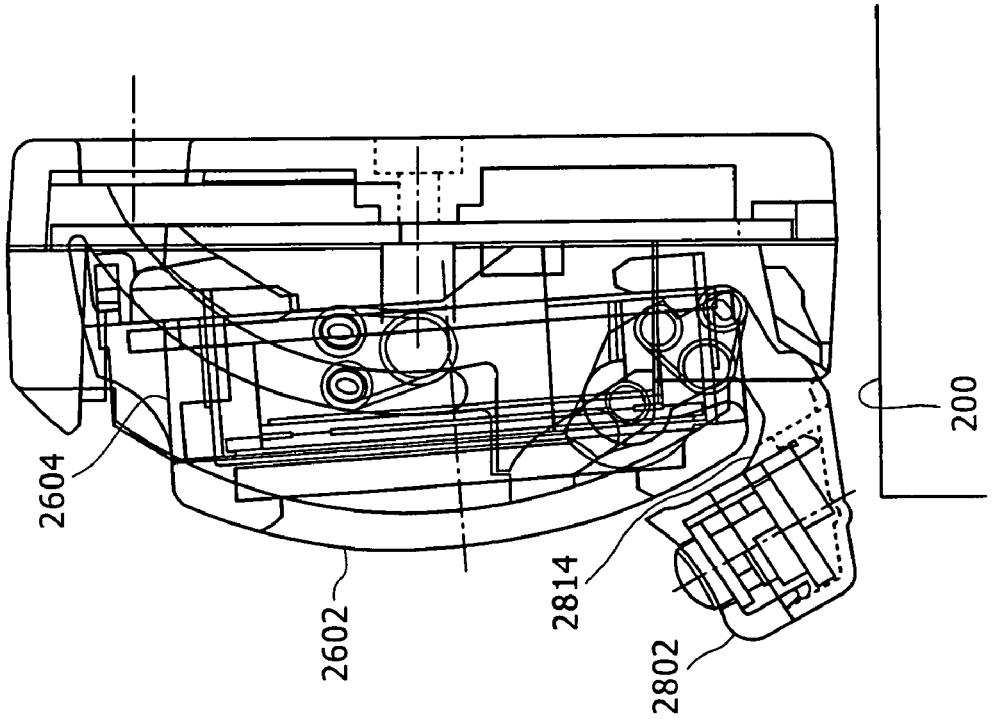

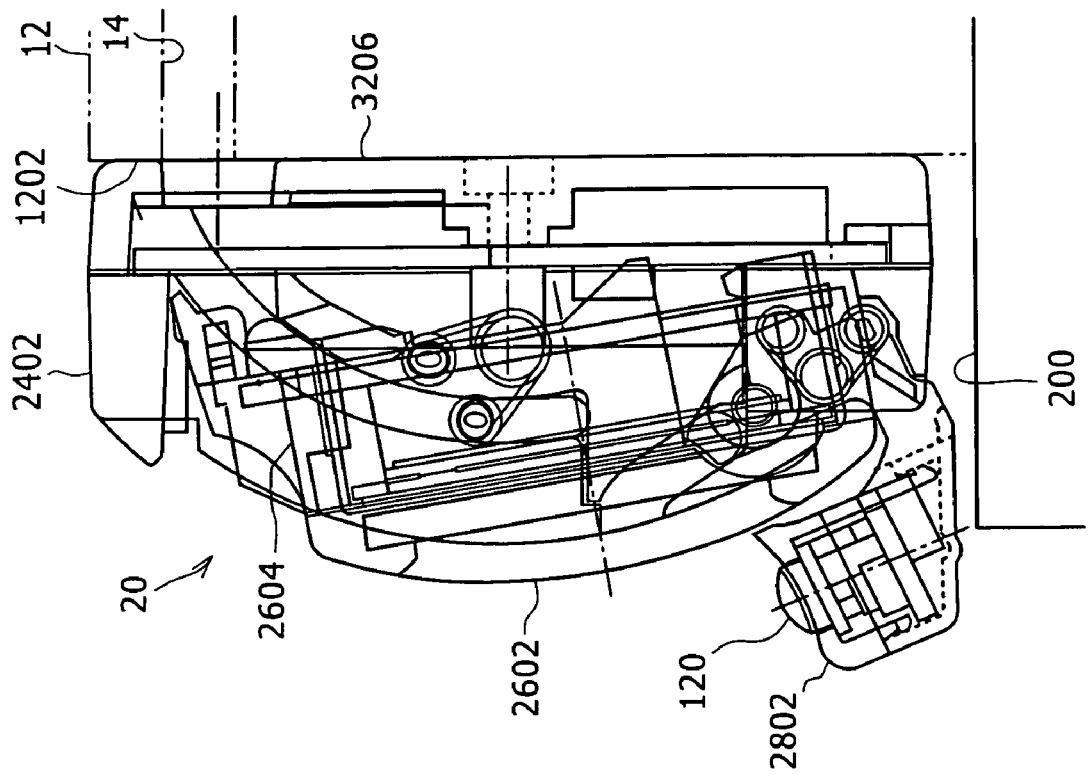
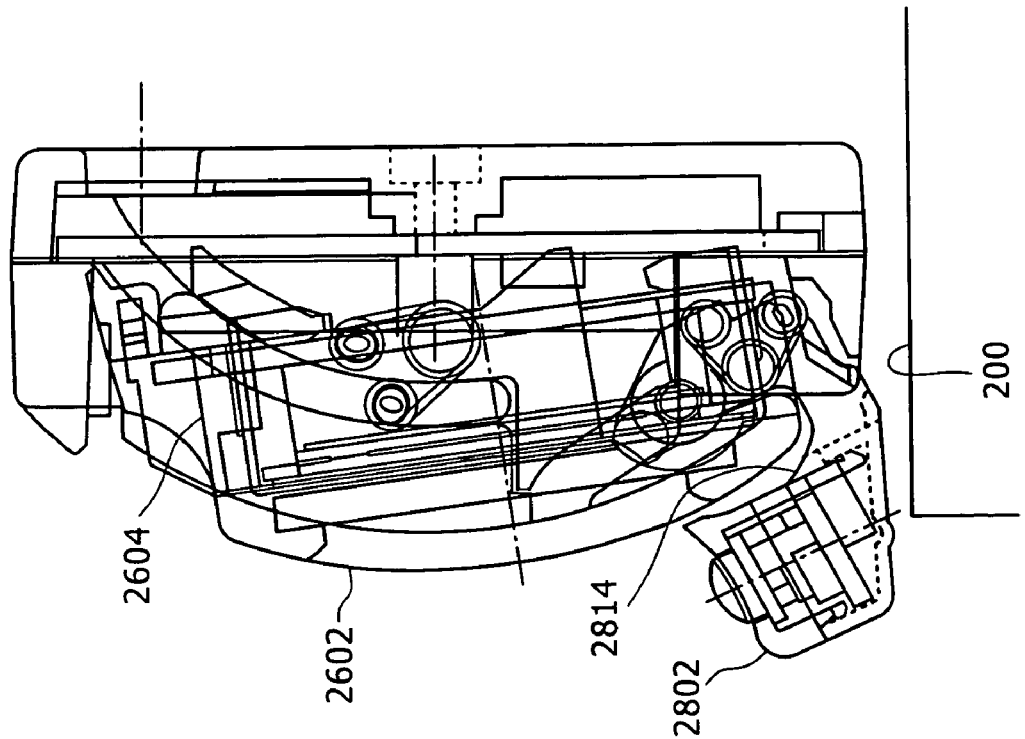

HOUSING FOR ON-VEHICLE ELECTRONIC APPARATUS

CROSS REFERENCES TO RELATED APPLICATIONS

The present invention contains subject matter related to Japanese Patent Application JP 2004-241358, filed in the Japanese Patent Office on Aug. 20, 2004, the entire contents of which being incorporated herein by reference.

BACKGROUND OF THE INVENTION

The present invention relates to a housing for an on-vehicle electronic apparatus.

On-vehicle electronic apparatuses used by inserting and removing a plate-like recording medium such as CD (compact disk) have been provided.

In a housing for such an on-vehicle electronic apparatus, it may be necessary to lay out a recording medium insertion slit for insertion and removal of the recording medium, operating switches for performing various operations, and a display for displaying various motion data and operation data, at a front surface of the housing.

However, the space of a dashboard of an automobile for disposing the housing for the on-vehicle electronic apparatus is limited to a predetermined size. In many cases, therefore, it may be necessary to reduce the sizes of the operating switches and the display, which is disadvantageous in enhancing the convenience in use.

In view of this, there have been provided housings for on-vehicle electronic apparatuses in which an open/close lid for opening and closing the recording medium insertion slit is provided, and the operating switches and the display are provided on the open/close lid, in order to cope with the above-mentioned problem. Examples of such a housing include one in which the open/close lid is supported so as to be swingable about a support shaft (see, for example, Japanese Patent Laid-open No. 2002-166786) and one in which a mechanism for drawing the opened open/close lid into the inside of the housing (see, for example, Japanese Patent Laid-open No. 2002-178842).

SUMMARY OF THE INVENTION

However, in the case where an open/close lid is swung as in the former of the related arts, it may be necessary to prevent the portion of the open/closed lid, when opened, from interfering with the external members in the surroundings of the housing for the on-vehicle electronic apparatus, such as the interior portions of the automobile and other on-vehicle electronic apparatuses, so that the shape of the open/close lid is restricted, which is disadvantageous in securing the degree of freedom in designing and in design.

In addition, in the case where a mechanism for drawing an open/close lid into the inside of the housing is adopted as in the latter of the related arts, it is possible to prevent the open/close lid from interfering with external members, but, on the other hand, a complicated mechanism such as a motive power source and a transmission mechanism for drawing in the open/close lid may be needed, which is disadvantageous in reducing the cost.

Thus, there is a need for provision of a housing for an on-vehicle electronic apparatus which is advantageous in reducing the cost while securing the degree of freedom in designing and in design.

In order to fulfill the need, according to one embodiment of the present invention, there is provided a housing for an on-vehicle electronic apparatus, including a housing body having a front surface elongate in the left-right direction and a recording medium insertion slit extending in the left-right direction at an upper portion of the front surface, and a front panel assembly detachably attached to the front surface of the housing body so as to openably close the recording medium insertion slit. The front panel assembly has a panel frame detachably attached to the front surface of the housing body, and an upper member and a lower member which are attached to the panel frame. The upper member has an upper panel portion elongate in the left-right direction. The lower member has a lower panel portion being connected to a lower portion of the upper member so as to be swingable about an axis extending in the left-right direction, being elongate in the left-right direction, and being disposed on the lower side of the upper panel portion. The panel frame is provided with a support mechanism which supports the upper member movably in a substantially vertical direction and which moves the upper panel portion between an upper position for closing the recording medium insertion slit and a lower position for opening the recording medium insertion slit. The panel frame is provided with a conjunction mechanism for ensuring that the lower member is swung in the front-rear direction about the axis according to the vertical movement of the upper member, the lower panel portion is set in an erected position for extending downwards continuously from the lower end of the upper panel portion when the upper panel portion is in the upper position, and the lower panel portion is set in a slant position for being directed slantly upwards, with its upper end located on the front side of a lower portion of the upper panel portion, when the upper panel portion is in the lower position.

According to another embodiment of the present invention, there is provided a housing for an on-vehicle electronic apparatus, including a housing body having a front surface elongate in the left-right direction and a recording medium insertion slit extending in the left-right direction at an upper portion of the front surface, and a panel provided at the front surface of the housing body so as to openably close the recording medium insertion slit. The panel has an upper member and a lower member. The upper member has an upper panel portion elongate in the left-right direction. The lower member has a lower panel portion being connected to a lower portion of the upper member so as to be swingable about an axis extending in the left-right direction, being elongate in the left-right direction, and being disposed on the lower side of the upper panel portion. A support mechanism which supports the upper member so as to be movable in a substantially vertical direction and which moves the upper panel portion between an upper position for closing the recording medium insertion slit and a lower position for opening the recording medium insertion slit is provided at a front surface of the housing body. A conjunction mechanism for ensuring that the lower member is swung in the front-rear direction about the axis according to the vertical movement of the upper member, the lower panel portion is set in an erected position for extending downwards continuously from the lower end of the upper panel portion when the upper panel portion is located in the upper position, and the lower panel portion is set in a slant position for being directed slantly upwards, with its upper end located on the front side of a lower portion of the upper panel portion, when the upper panel portion is located in he lower position is provided at the front surface of the housing body.

According to the present invention, there is adopted the simple configuration in which the upper member is supported to be movable in the vertical direction by the support mechanism and the lower member is swung in the front-rear direction according to the vertical movement of the upper member by the conjunction mechanism. Therefore, in contrast to the related art in which an open/close lid is drawn into the inside of a housing, it is unnecessary to provide a complicated mechanism such as a motive power source and a transmission mechanism for drawing in an open/close lid, which is advantageous in reducing the cost.

BRIEF DESCRIPTION OF THE DRAWINGS

FIGS. 2A and 2B are illustrations of a front panel assembly 20, in which FIG. 2A is a perspective view showing the condition where a recording medium insertion slit in a housing 10 is closed, and FIG. 2B is a perspective view showing the condition where the recording medium insertion slit in the housing 10 is opened;

FIG. 3 is a perspective view showing a housing body 12;

FIGS. 4A and 4B are illustrations of a panel frame 22 of a rear frame 32, in which FIG. 4A is a perspective view of the rear frame 32 as viewed from the front upper side, and FIG. 4B is a perspective view of the rear frame 32 as viewed from the rear lower side;

FIGS. 5A and 5B are illustrations of a guide plate 30, in which FIG. 5A is a perspective view of the guide plate 30 as viewed from the upper lower side, and FIG. 5B is a perspective view of the guide plate 30 as viewed from the rear lower side;

FIGS. 6A and 6B are illustrations of the panel frame 22 and a front frame 24, in which FIG. 6A is a perspective view of the front frame 24 as viewed from the front upper side, and FIG. 6B is a perspective view of the front frame 24 as viewed from the rear lower side;

FIGS. 7A and 7B are illustrations of an upper member 26, in which FIG. 7A is a perspective view of the upper member 26 as viewed from the front upper side, and FIG. 7B is a perspective view of the upper member 26 as viewed from the rear lower side;

FIGS. 8A and 8B are illustrations of a lower member 28, in which FIG. 8A is a perspective view of the lower member 28 as viewed from the front upper side, and FIG. 8B is a perspective view of the lower member 28 as viewed from the rear lower side;

FIGS. 10A and 10B are perspective views showing the upper member and the lower member in the condition where the recording medium insertion slit 14 in the housing 10 is closed, in which FIG. 10A is a perspective view as viewed from the front side, and FIG. 10B is a perspective view as viewed from the rear side;

FIGS. 11A and 11B are perspective views showing the upper member and the lower member in the condition where the recording medium insertion slit 14 in the housing 10 is opened, in which FIG. 11A is a perspective view as viewed from the front side, and FIG. 11B is a perspective view as viewed from the rear side;

FIGS. 14A and 14B are illustrations of the movements of the upper member 26 and the lower member 28;

FIGS. 15A and 15B are illustrations of the movements of the upper member 26 and the lower member 28;

FIGS. 16A and 16B are illustrations of the movements of the upper member 26 and the lower member 28;

FIGS. 17A and 17B are illustrations of the movements of the upper member 26 and the lower member 28;

FIGS. 18A and 18B are illustrations of the movements of the upper member 26 and the lower member 28;

FIGS. 22A and 22B are assembly diagrams of the slide member 1806 and the movable claw 1808, in which FIG. 22A shows the condition where a fixed claw 1807 and the movable claw 1808 are closed, and FIG. 22B shows the condition where the fixed claw 1807 and the movable claw 1808 are opened;

FIGS. 23A and 23B are illustrations of the engaging/disengaging mechanism 18, in which FIG. 23A is an illustration of a locked condition, and FIG. 23B is an illustration of an unlocked condition; and FIGS. 24A and 24B are illustrations of the engaging/disengaging mechanism 18, in which FIG. 24A is a view along arrow A of FIG. 23A, and FIG. 24B is a view along arrow B of FIG. 23A.

DETAILED DESCRIPTION OF THE PREFERRED EMBODIMENTS

Figure 1:
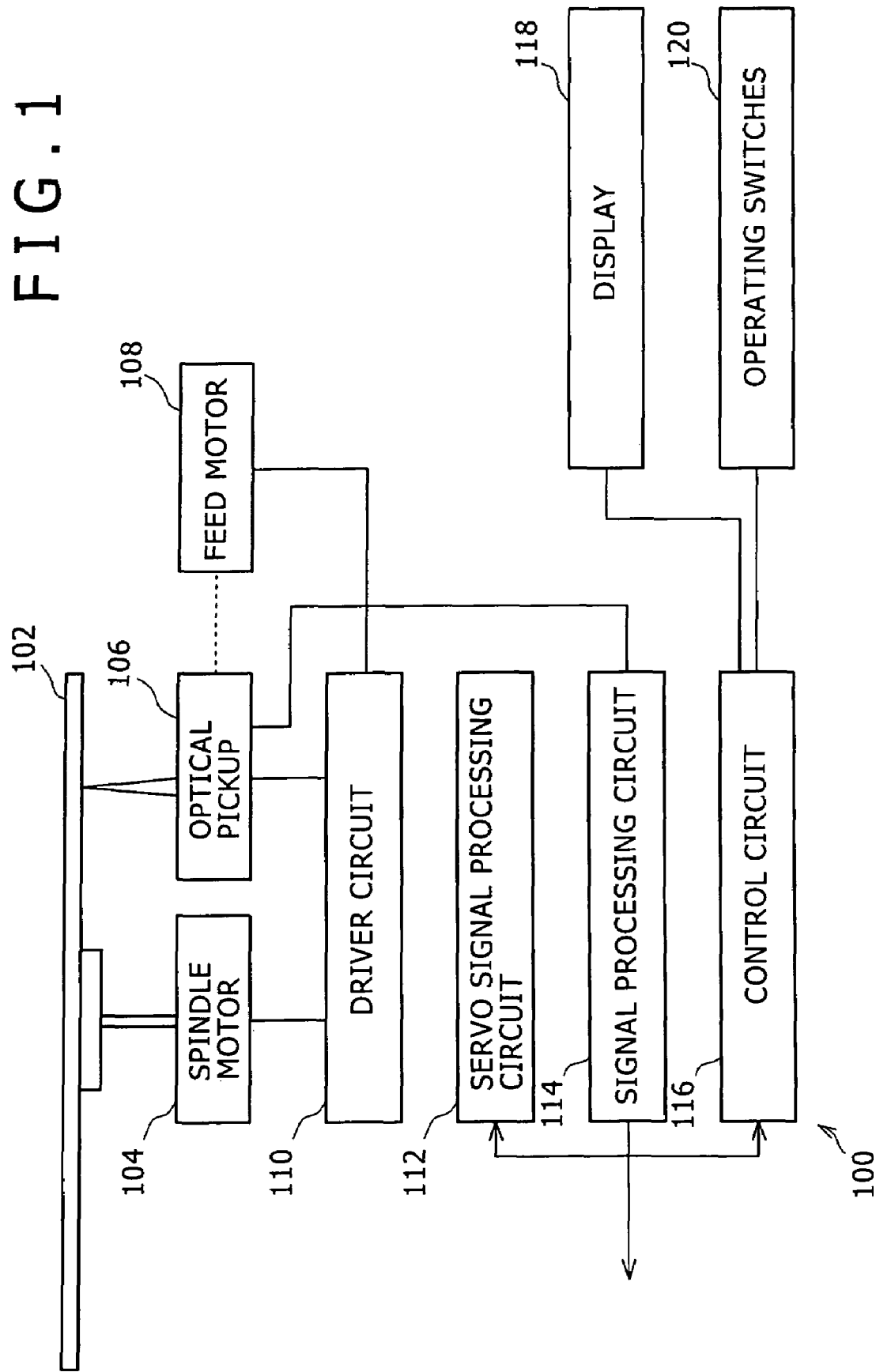
FIG. 1 is a block diagram showing the configuration of a control system in an on-vehicle electronic apparatus to which a housing according to Example 1 of the present invention has been applied.

The need to reduce the cost while securing the degree of freedom in designing and in design has been met by a configuration in which an upper member is supported to be movable in the vertical by a support mechanism and a lower member is swung in the front-rear direction according to the vertical movement of the upper member by a conjunction mechanism.

EXAMPLE 1

Now, Example 1 of the present invention will be described below referring to the drawings.

FIG. 1 is a block diagram showing the configuration of a control system in an on-vehicle electronic apparatus to which a housing according to Example 1 of the present invention has been applied. Incidentally, in this example, the on-vehicle electronic apparatus is a car audio system.

First, the configuration of the control system in the on-vehicle electronic apparatus will be described referring to FIG. 1. The on-vehicle electronic apparatus 100 includes a spindle motor 104 as a drive means for rotatingly driving a plate-like optical disk 102 (corresponding to the recording medium in claims) such as a CD or a DVD, an optical pickup 106 for irradiating the optical disk 102 with a light beam and receiving the reflected light beam to detect a tracking error signal, a focus error signal, a synchronization signal and a reproduction signal, and a feed motor 108 as a drive means for moving the optical pickup 106 in the radial direction of the optical disk 102.

In addition, the on-vehicle electronic apparatus 100 has a driver circuit 110, a servo signal processing circuit 112, a signal processing circuit 114, a control circuit 116, a display 118 and operating switches 120.

The driver circuit 110 supplies drive signals to actuators of the spindle motor 104, the feed motor 108 and the optical pickup 106, based on the control of the servo signal processing circuit 112.

The signal processing circuit 114 amplifies and demodulates the reproduced signals supplied from the optical pickup 106 to regenerate the sound and picture information recorded on the optical disk 102, and outputs the signals as an audio signal and a video signal. The audio signal and video signal thus outputted are supplied to loudspeakers and a monitor.

In addition, the signal processing circuit 114 amplifies and arithmetically processes the tracking error signal and the focus error signal supplied from the optical pickup 106, and supplies the processed signals to the servo signal processing circuit 112.

The servo signal processing circuit 112, by controlling the driver circuit 110, controls the drive signal supplied from the driver circuit 110 to the spindle motor 104, thereby controlling the rotation of the spindle motor 104.

In addition, the servo signal processing circuit 112, by controlling the driver circuit 110, controls the drive signal supplied from the driver circuit 110 to the feed motor 108, thereby controlling the feeding of the optical pickup 106 in the radial direction of the optical disk 102 (seek control).

Besides, the servo signal processing circuit 112 controls the driver circuit 110 on the basis of the tracking error signal and the focus error signal supplied from the signal processing circuit 114, so as to control the drive signals for a tracking actuator and a focusing actuator supplied from the driver circuit 110 to the optical pickup 106, thereby controlling the tracking servo and the focusing servo.

The control circuit 116 administrates the control of the servo signal processing circuit 112 and the signal processing circuit 114.

In addition, the control circuit 116 causes the display 118 to display various information about the operations of the on-vehicle electronic apparatus 100.

Besides, the control circuit 116 controls the servo signal processing circuit 112 and the signal processing circuit 114 on the basis of operation signals inputted from the plurality of operating switches 120, thereby controlling the operations of the on-vehicle electronic apparatus 100.

Now, the housing 10 for the on-vehicle electronic apparatus 100 according to Example 1 will be described below.

Figure 2A:
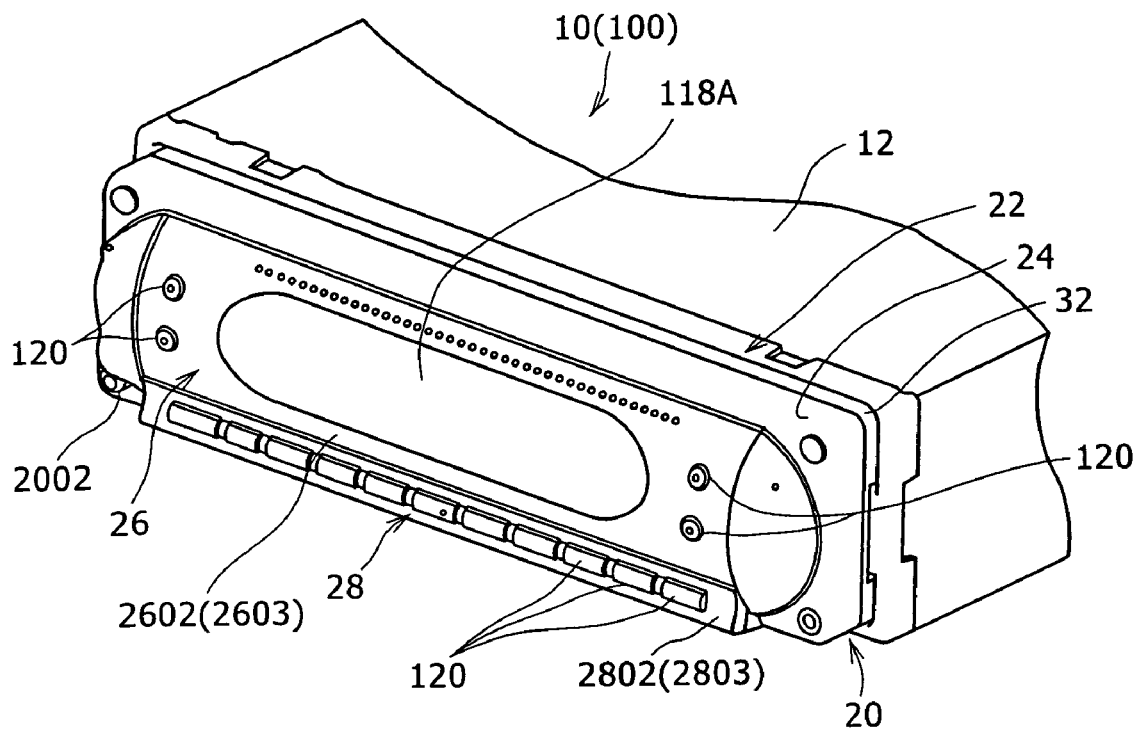
Figure 2B:
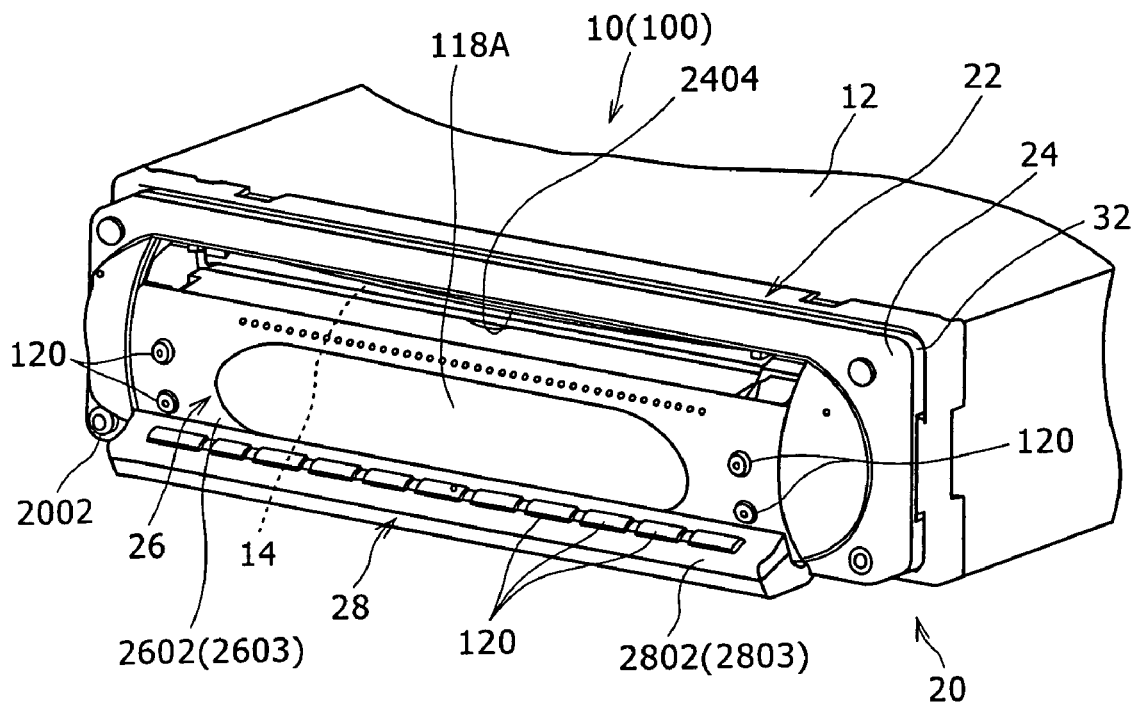

FIG. 2A is a perspective view showing the condition where a recording medium insertion slit in a housing 10 is closed, and FIG. 2B is a perspective view showing the condition where the recording medium insertion slit in the housing 10 is opened, and FIG. 3 is a perspective view showing a housing body 12.

Figure 4A:
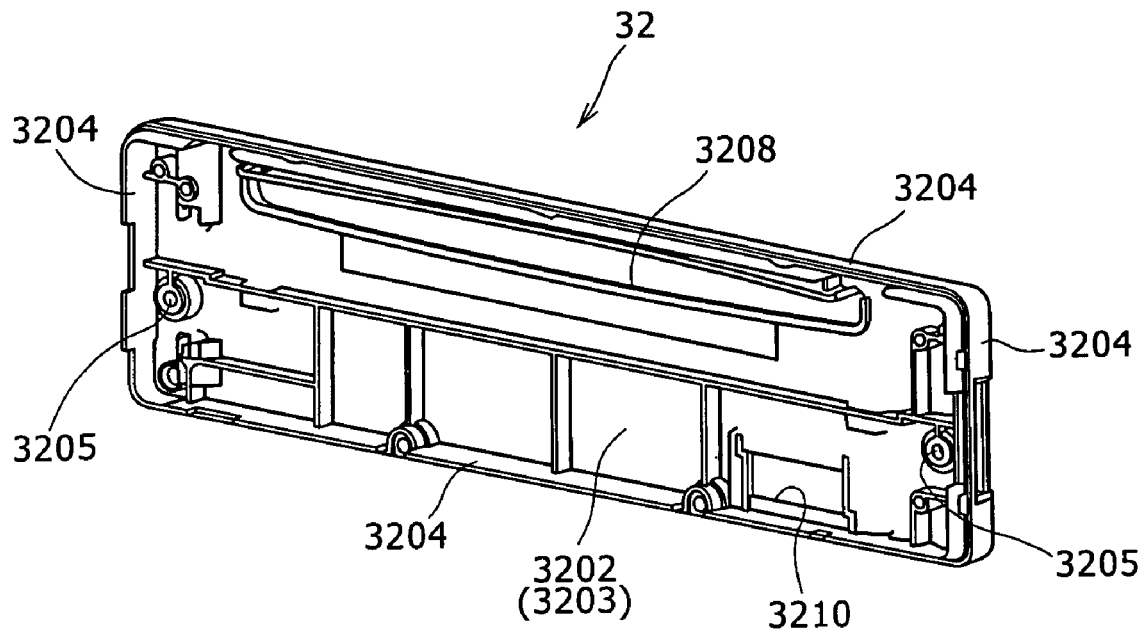
Figure 4B:
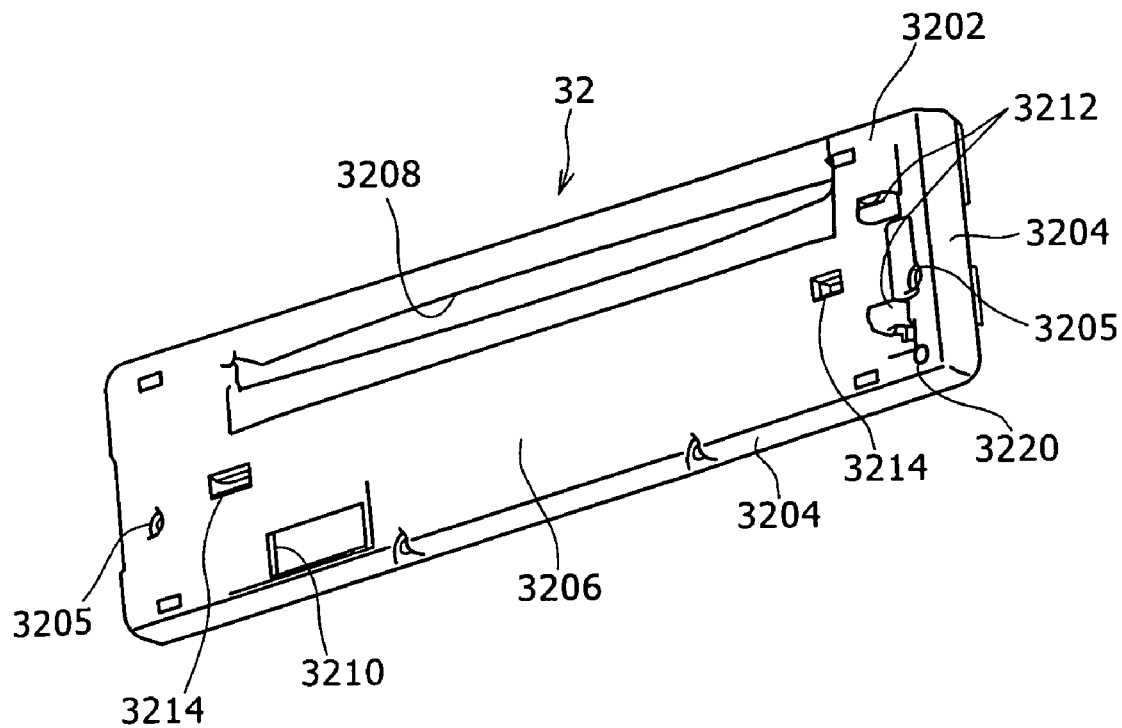

FIG. 4A is a perspective view of the rear frame 32 of a panel frame 22 as viewed from the front upper side, and FIG. 4B is a perspective view of the rear frame 32 as viewed from the rear lower side.

FIG. 5A is a perspective view of the guide plate 30 as viewed from the front lower side, and FIG. 5B is a perspective view of the guide plate 30 as viewed from the rear lower side.

Figure 6A:
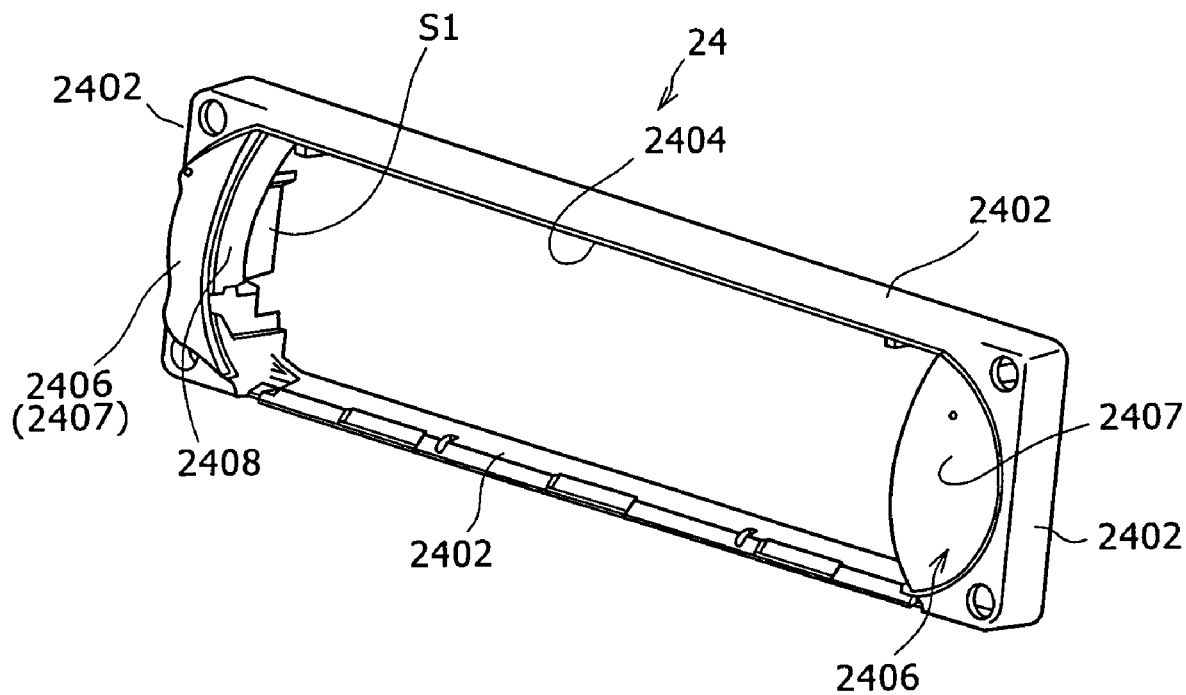
Figure 6B:
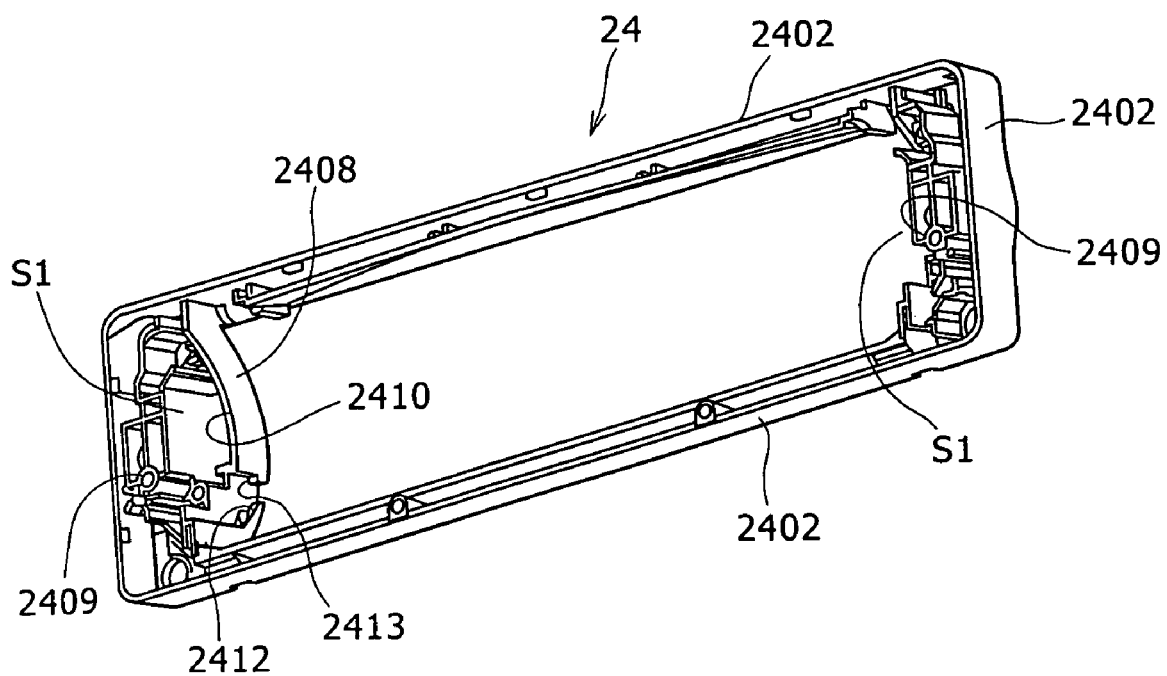

FIG. 6A is a perspective view of the front frame 24 of the panel frame 22 as viewed from the front upper side, and FIG. 6B is a perspective view of the front frame 24 as viewed from the rear lower side.

Figure 7A:
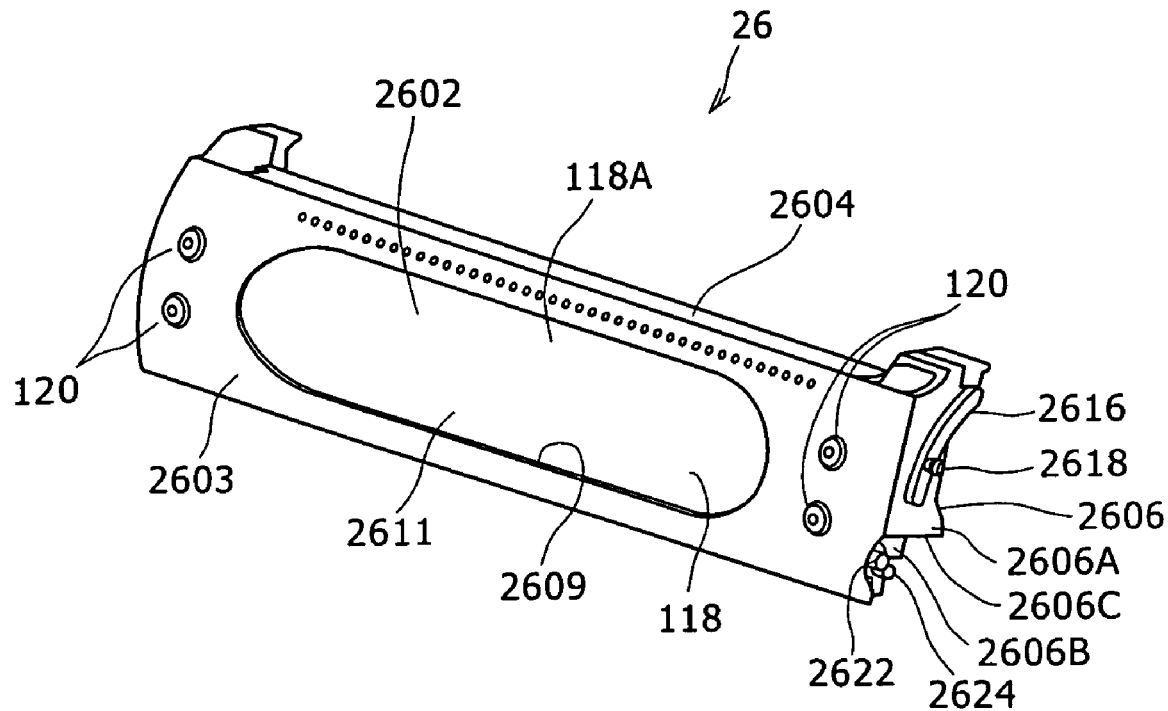
Figure 7B:
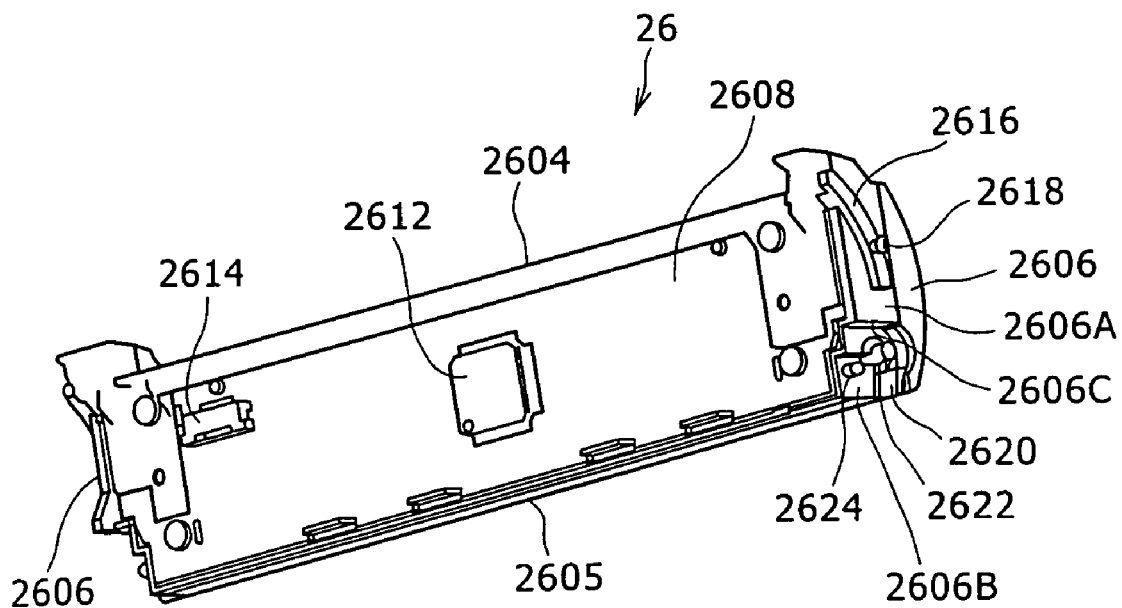

FIG. 7A is a perspective view of the upper member 26 as viewed from the front upper side, and FIG. 7B is a perspective view of the upper member 26 as viewed from the rear lower side.

Figure 8A:
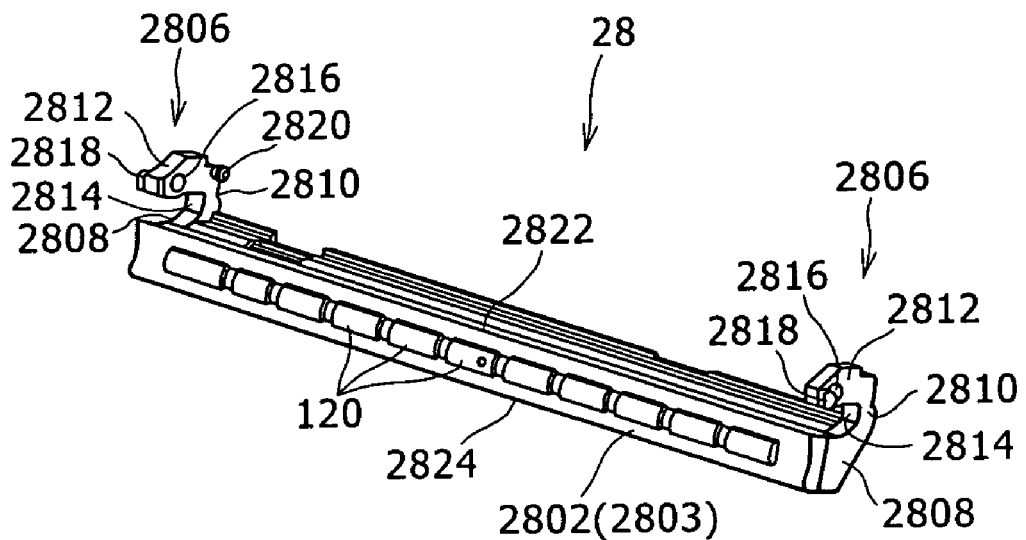
Figure 8B:
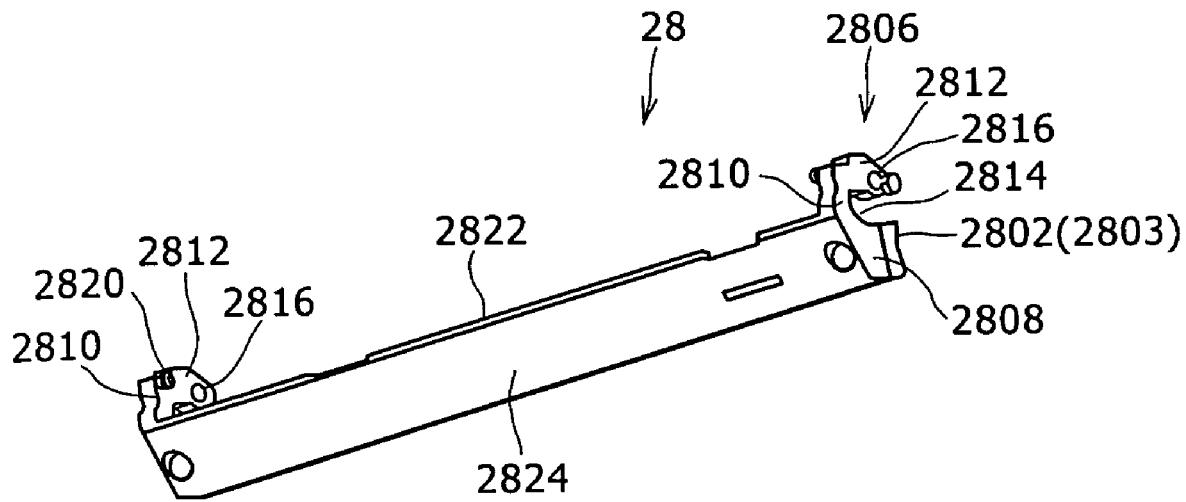

FIG. 8A is a perspective view of the lower member 28 as viewed from the front upper side, and FIG. 8B is a perspective view of the lower member 28 as viewed from the rear lower side.

Figure 9:
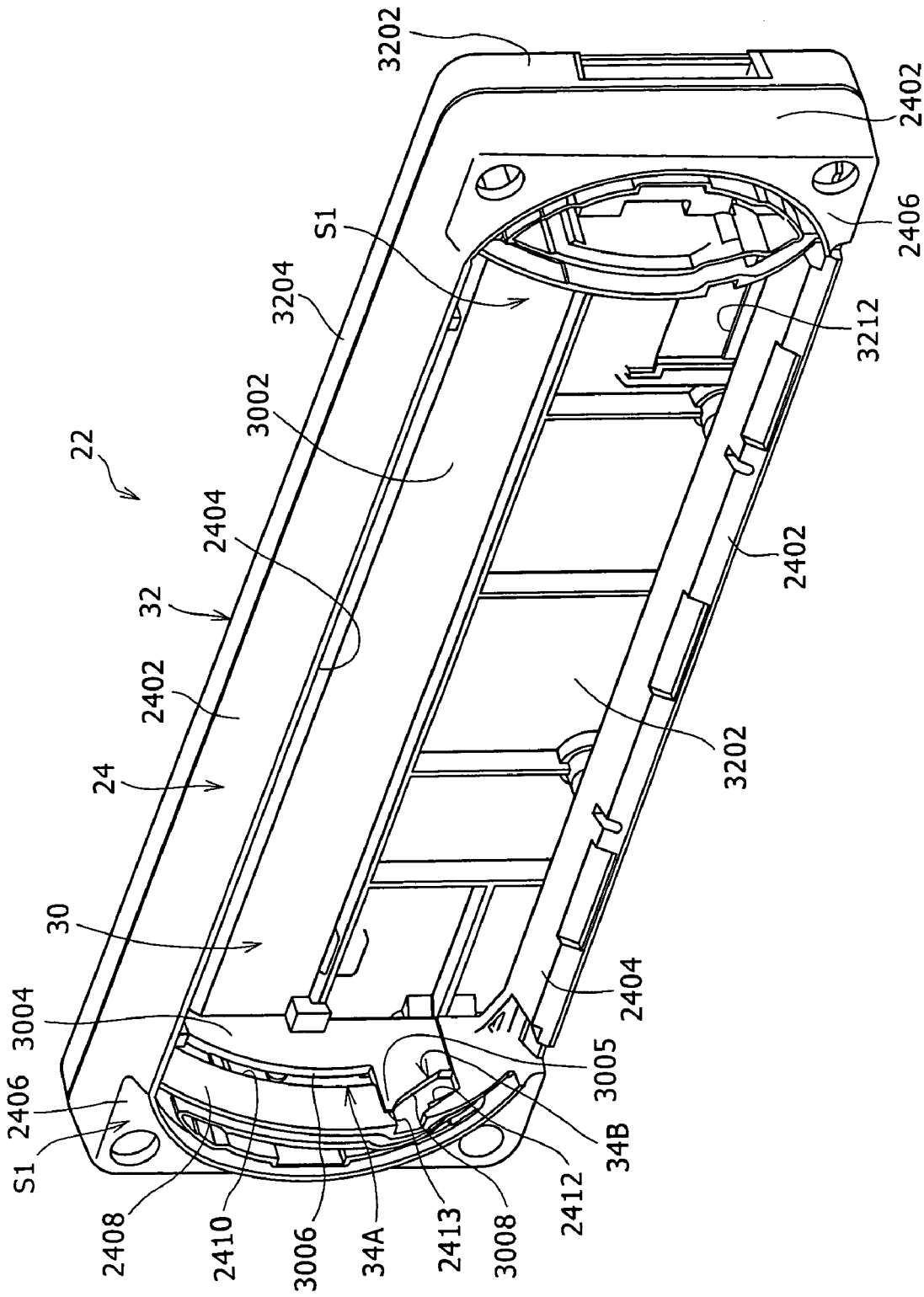
FIG. 9 is a perspective view of the panel frame.

FIG. 9 is a perspective view showing the condition where a bulged wall 2407 is removed from the panel frame 22 assembled.

Figure 10A:
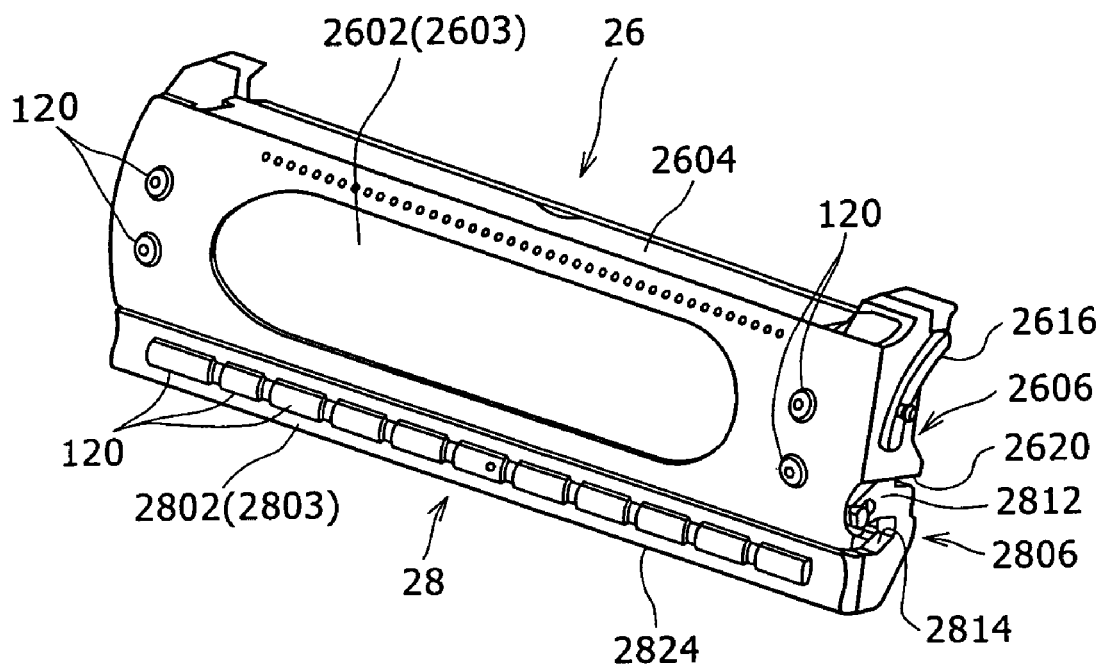
Figure 10B:
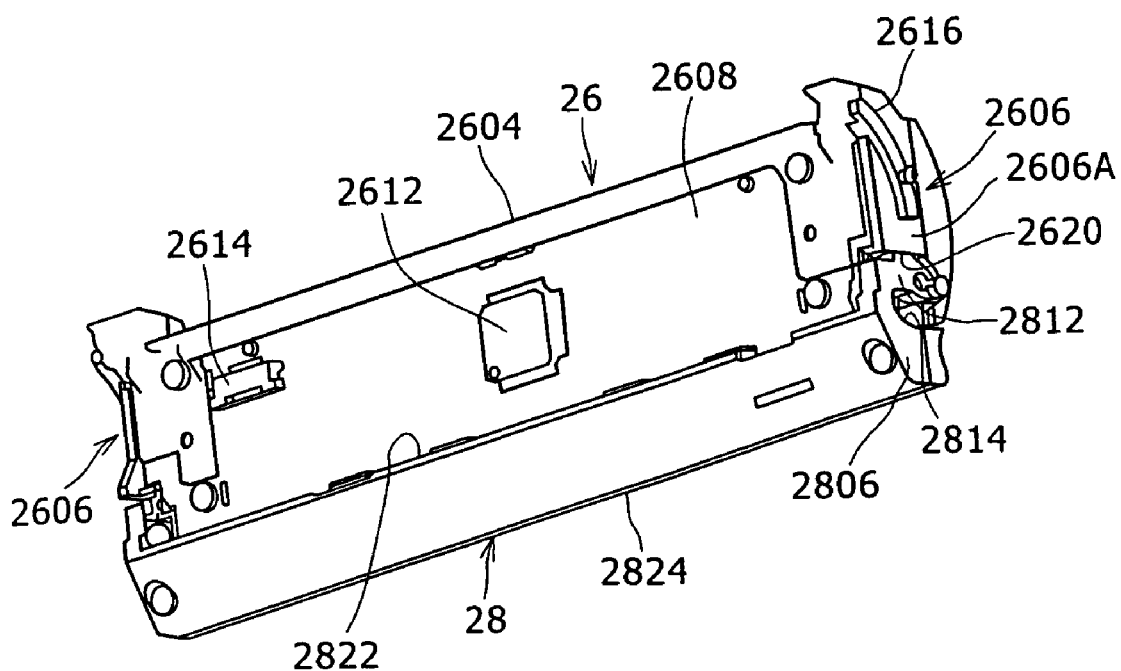

FIGS. 10A and 10B are perspective views showing the upper member 26 and the lower member 28 in the condition where the recording medium insertion slit 14 in the housing 10 is closed, in which FIG. 10A is a view as viewed from the front side, and FIG. 10B is a view as viewed from the rear side.

Figure 11A:
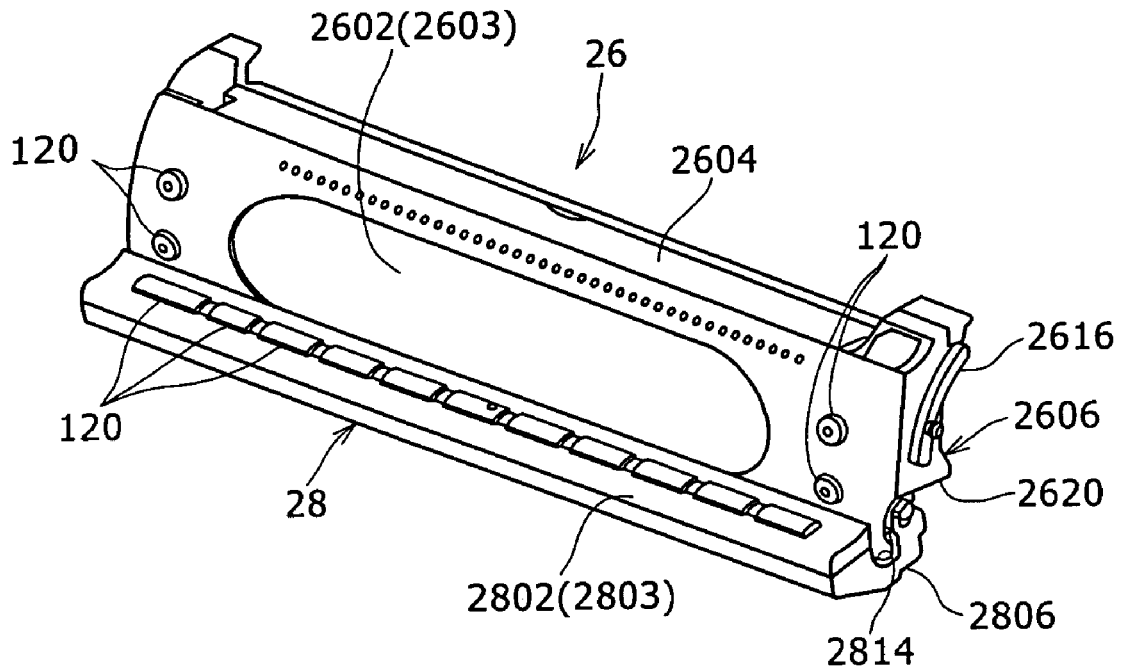
Figure 11B:
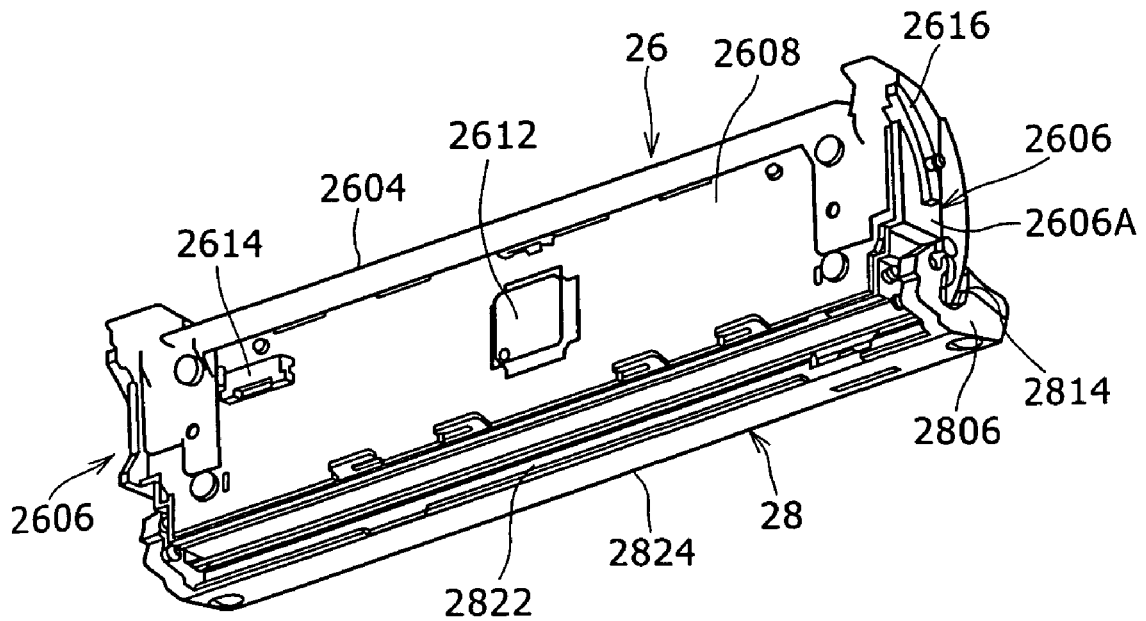

FIGS. 11A and 11B are perspective views showing the upper member 26 and the lower member 28 in the condition where the recording medium insertion slit 14 in the housing 10 is opened, in which FIG. 11A is a view as viewed from the front side, and FIG. 11B is a view as viewed from the rear side.

Figure 12:
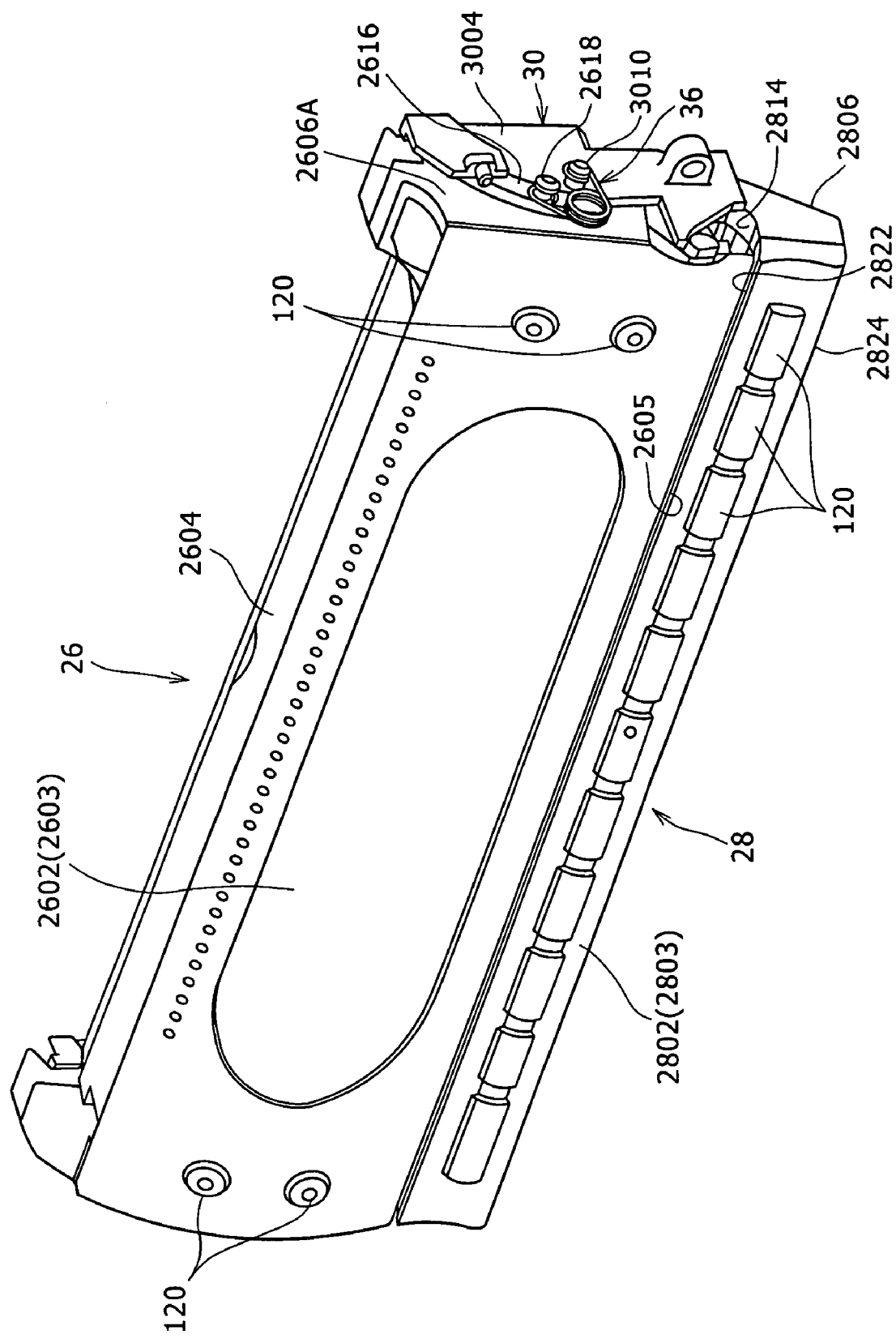
FIG. 12 is a perspective view showing the upper member, the lower member and a guide plate in the condition where the recording medium insertion slit 14 in the housing 10 is closed.

FIG. 12 is a perspective view showing the upper member 26, the lower member 28 and a guide plate 30 in the condition where the recording medium insertion slit 14 in the housing 10 is closed.

Figure 13:
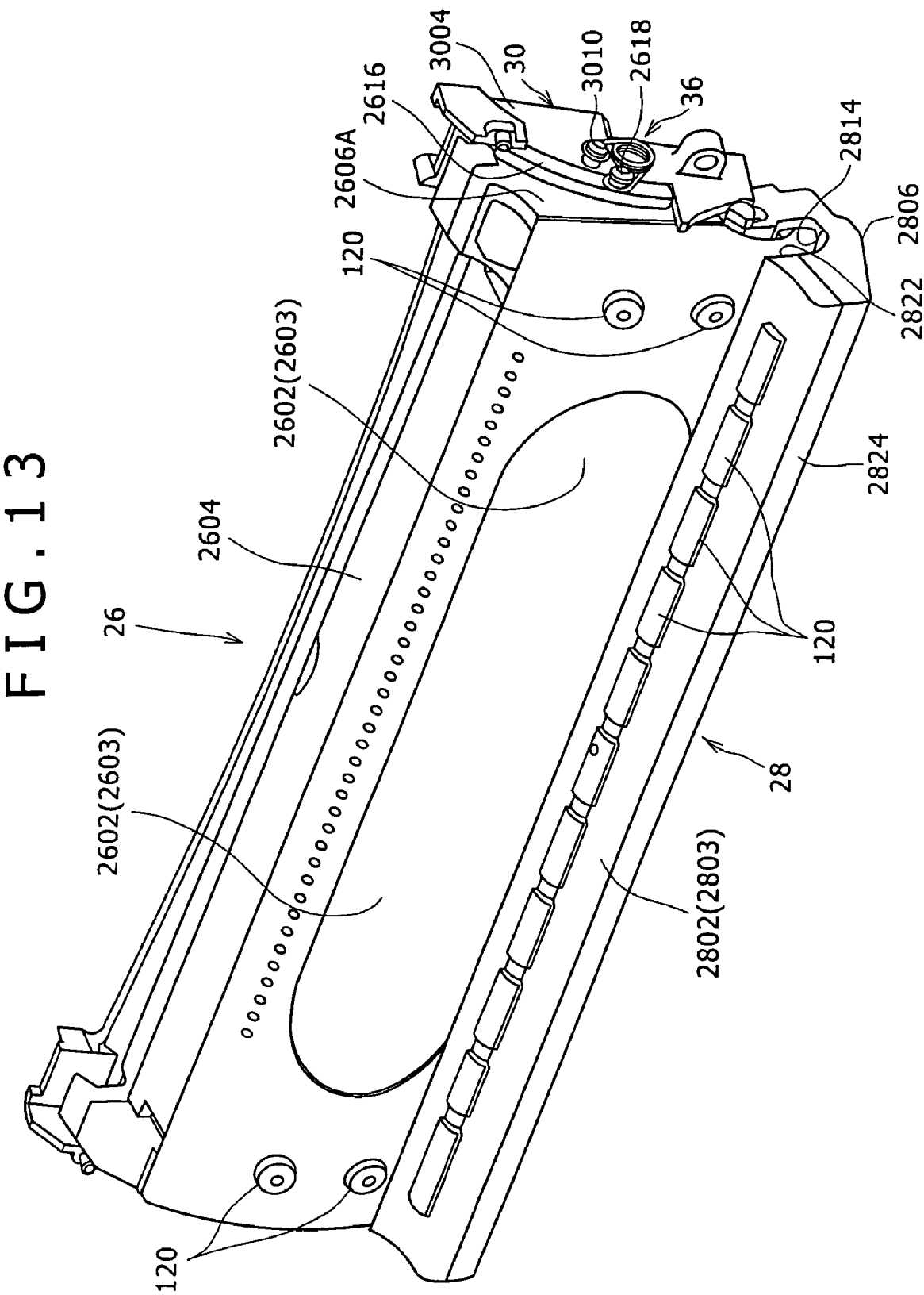
FIG. 13 is a perspective view showing the upper member, the lower member and the guide plate in the condition where the recording medium insertion slit 14 in the housing 10 is opened.

FIG. 13 is a perspective view showing the upper member 26, the lower member 28 and the guide plate 30 in the condition where the recording medium insertion slit 14 in the housing 10 is opened.

FIGS. 14A and 14B, FIGS. 15A and 15B, FIGS. 16A and 16B, FIGS. 17A and 17B, and FIGS. 18A and 18B are illustrations of the movements of the upper member 26 and the lower member 28.

Figure 19:
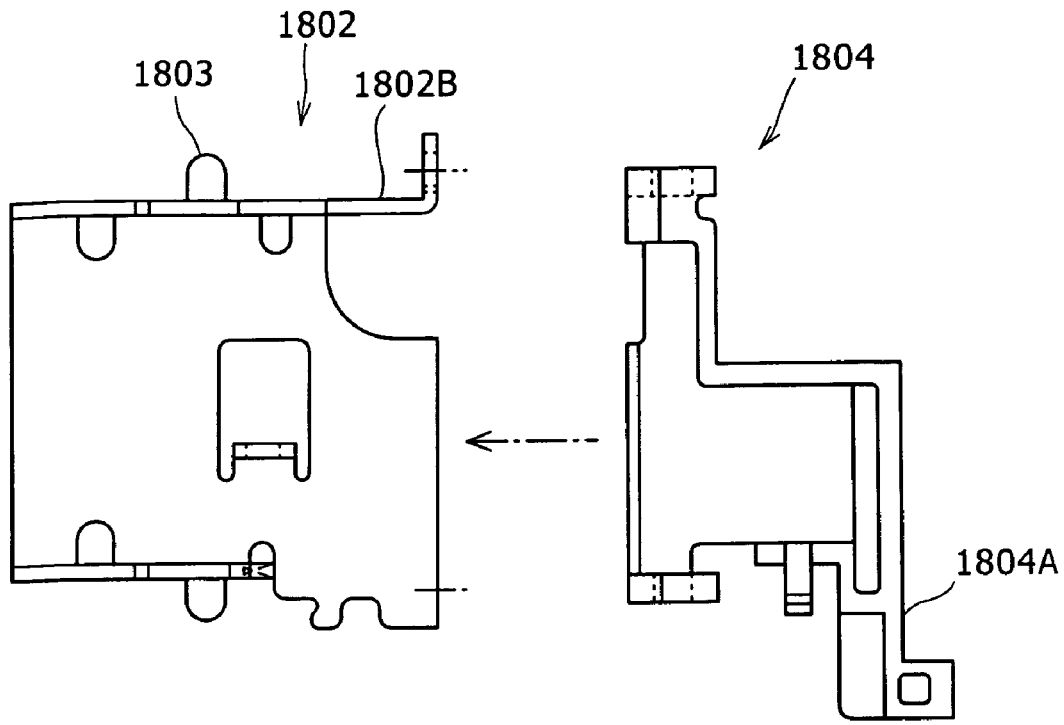
FIG. 19 is a front view of a bracket and a release lever which constitute an engaging/disengaging mechanism 18 provided at a front portion of the housing body 12.
Figure 20:
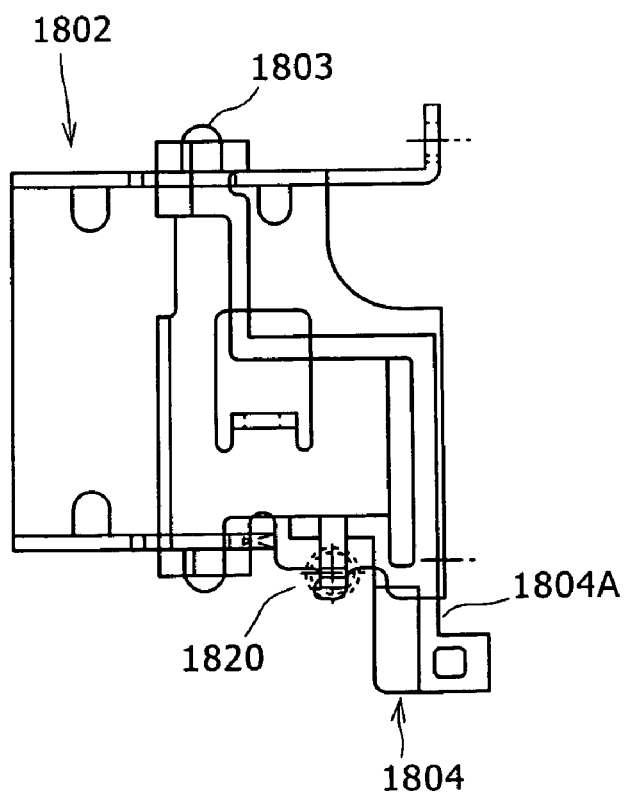
FIG. 20 is an assembly diagram of the bracket 1802 and the release lever 1804.
Figure 21:
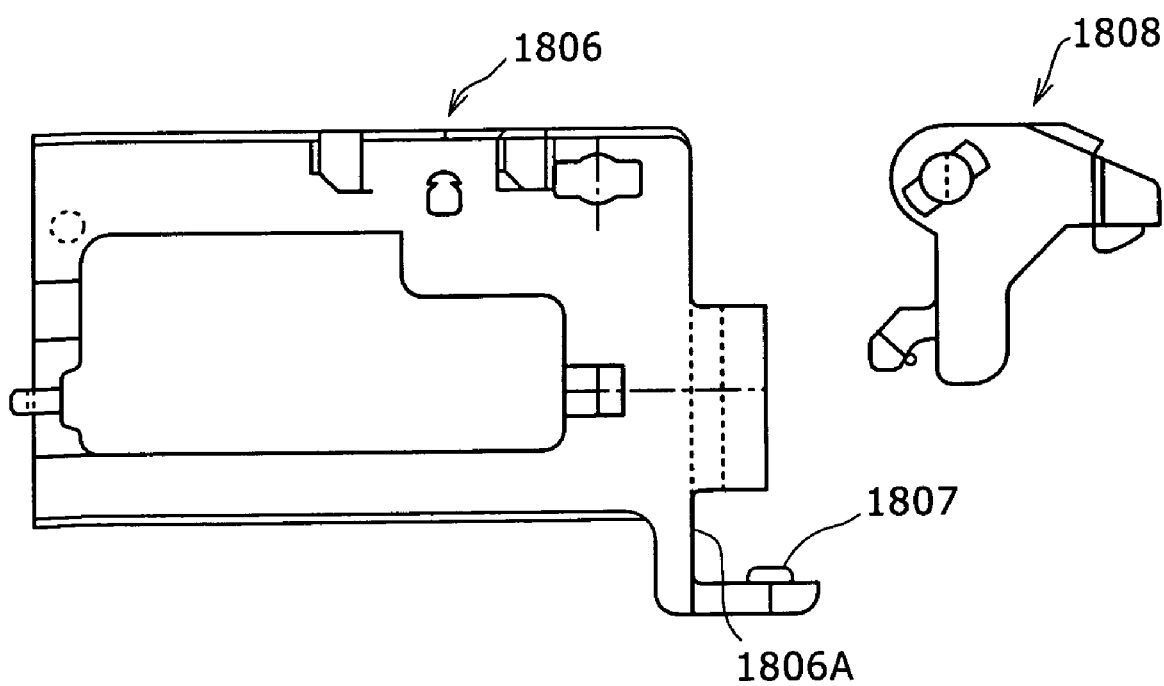
FIG. 21 is a front view of a slide member 1806 and a movable claw 1808.
Figure 22A:
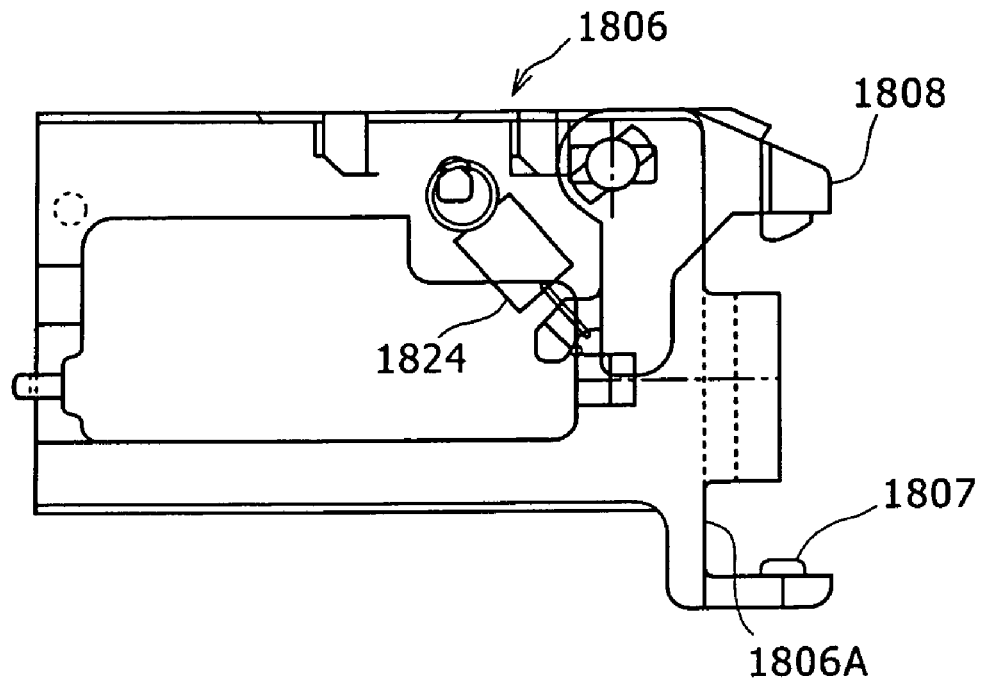
Figure 22B:
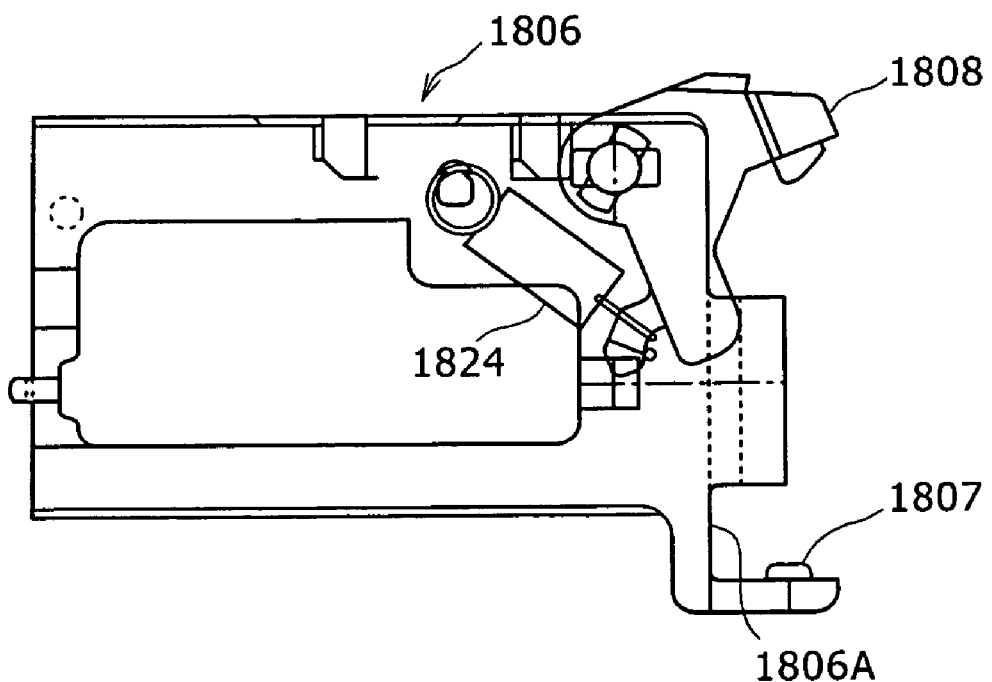
Figure 23A:
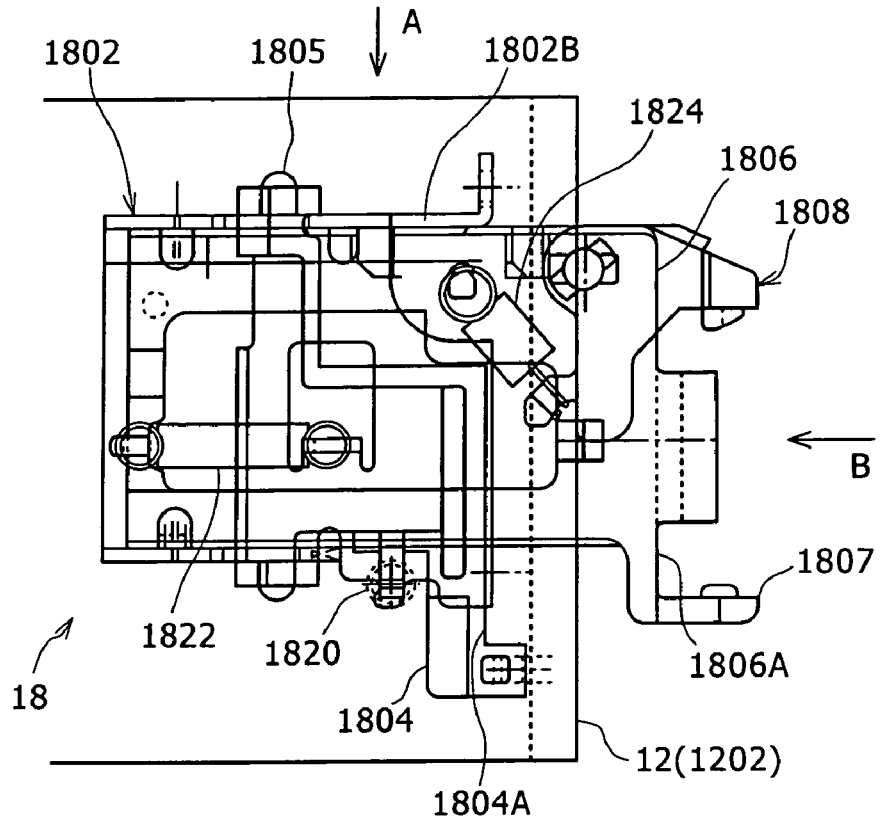
Figure 23B:
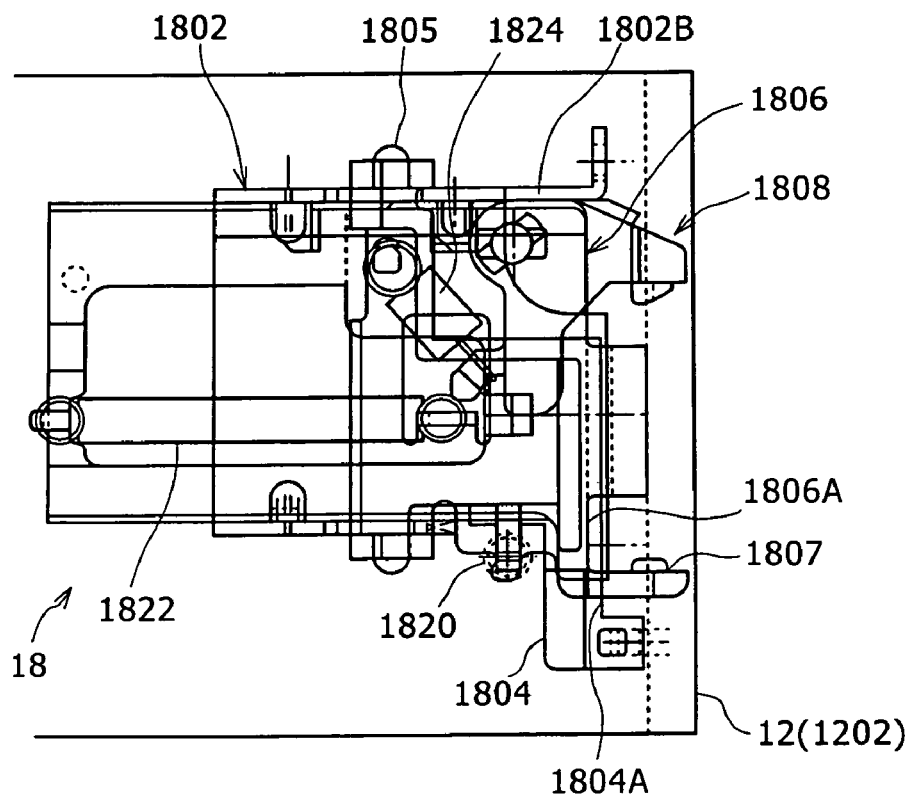
Figure 24A:
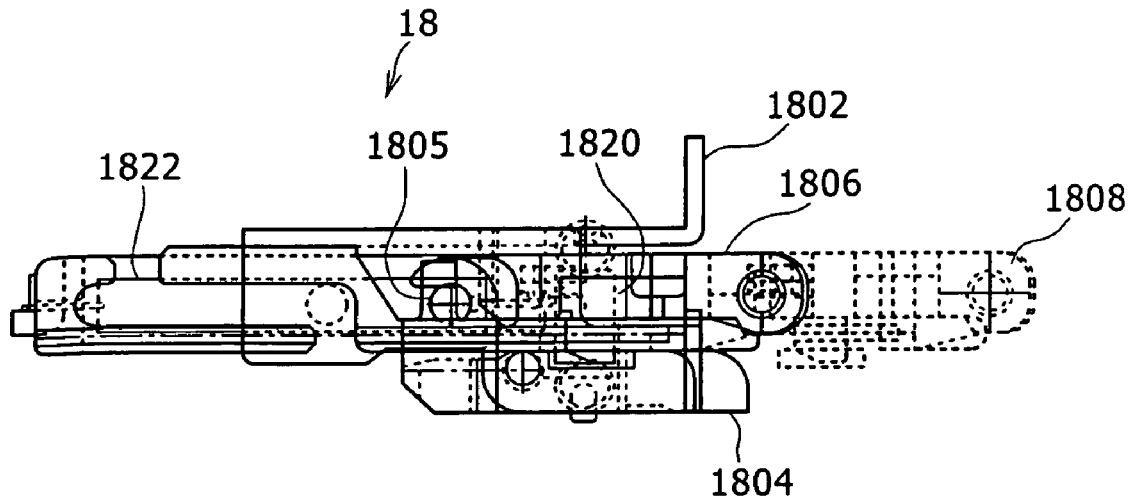
Figure 24B:
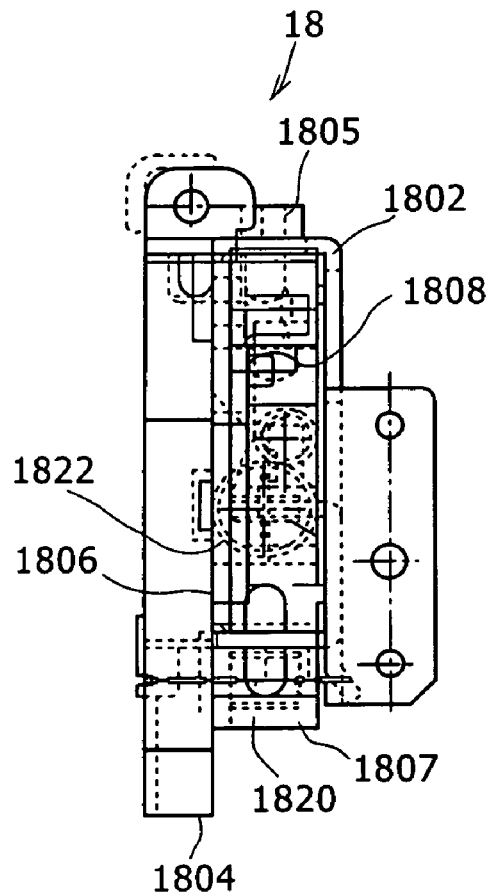

FIG. 19 is a front view of a bracket 1802 and a release lever 1804 which constitute an engaging/disengaging mechanism provided at a front portion of the housing body 12, FIG. 20 is an assembly diagram of the bracket 1802 and the release lever 1804, FIG. 21 is a front view of a slide member 1806 and a movable claw 1808, FIGS. 22A and 22B are assembly diagrams of the slide member 1806 and the movable claw 1808, FIG. 23A is an illustration of the engaging/disengaging mechanism 18 in a locked condition, FIG. 23B is an illustration of the engaging/disengaging mechanism 18 in an unlocked condition, FIG. 24A is a view along arrow A of FIG. 23A, and FIG. 24B is a view along arrow B of FIG. 23A.

As shown in FIGS. 2 and 3, the housing 10 for the on-vehicle electronic apparatus 100 includes a housing body 12, and a front panel assembly 20 detachably attached to a front surface 1202 of the housing body 12.

Incidentally, hereinafter the left and right will be the left and right as viewed from the front side of the housing 10, and the front and rear sides will be the front and rear sides of the housing 10.

The housing 10 is formed in a flat rectangular plate-like shape having a vertical height, a width in the left-right direction greater than the height, and a length in the front-rear direction greater than the height, and has a front surface 1202 in a rectangular shape elongate in the left-right direction.

The front surface 1202 of the housing body 12 is provided in its upper portion with a recording medium insertion slit 14 which extends in the left-right direction along the upper edge of the front surface 1202 and through which an optical disk 102 (disk form recording medium) is inserted and removed.

A housing body side connector 16 is provided at a right side lower portion of the front surface 1202, an engaging/disengaging mechanism 18 is provided in an opening 1204 formed in a left side portion of the front surface 1202, and two positioning projected portions 1206 spaced from each other in the left-right direction are projectingly provided at intermediate portions in the vertical direction of the front surface 1202.

The front panel assembly 20 has a panel frame 22 detachably attached to the front surface 1202 of the housing body 12, an upper member 26 and a lower member 28 which are attached to the panel frame 22, and the like.

The panel frame 22 has a rear frame 32 detachably attached to the front surface 1202 of the housing body 12, and a front frame 24 attached to a front portion of the rear frame 24.

As shown in FIG. 4, the rear frame 32 has a rear surface wall 3202 in a rectangular plate-like shape elongate in the left-right direction with a profile substantially the same (the same in left-right width and slightly smaller in vertical height) as the profile of the front surface 1202 of the housing body 12, and four wall portions 3204 erected forwards respectively from the four sides of the front surface 3203 of the rear surface wall 3202, and is configured to be mounted in the condition where the rear surface 3206 of the rear surface wall 3202 is laid on the front surface 1202 of the housing body 12.

At an upper portion of the rear surface wall 3202, a slit 3208 communicated with the recording medium insertion slit 14 is formed extending in the left-right direction.

In addition, an opening 3210 is formed at a right side lower portion of the rear surface wall 3202 in correspondence with the housing body side connector 16 of the housing body 12, and a panel assembly side connector (not shown) is provided in the inside of the panel frame 22 so as to front on the opening 3210.

Besides, screw insertion holes 3205 are penetratingly formed at intermediate portions in the vertical direction on both sides in the width direction of the rear surface wall 3202.

At intermediate portions in the vertical direction, corresponding to the two positioning projected portions 1206, of the rear surface wall 3206, two positioning recessed portions 3214 to be engaged with and disengaged from the two positioning projected portions 1206 are provided. By the engagement of the projected portions 1206 and the recessed portions 3214 with each other, the rear surface 3206 is roughly positioned relative to the front surface 1202 of the housing body 12, the connection between the housing body side connector 16 and the panel assembly side connector which will be described later is made smoothly, and the connection between lock claws 3212 and the engaging/disengaging mechanism 18 is made smoothly.

At portions, corresponding to the engaging/disengaging mechanism 18, of a left side portion of the rear surface 3206, the two lock claws 3212 to be connected to the engaging/disengaging mechanism 18 are projectingly provided at an interval in the vertical direction.

In this example, a guide member 30 shown in FIG. 5 is attached to the front surface 3203 of the rear frame 32.

The guide member 30 has a belt-like connection wall 3002 extendingly formed in a size shorter than the interval between the two wall portions 3204 located at both ends in the width direction of the rear frame 32, two guide walls 3004 erected from both ends of the connection wall 3002 orthogonally to the connection wall 3002 and parallel to each other, and projections 3005 provided on the guide walls 3004.

As shown in FIGS. 5 and 9, the attachment of the guide member 30 to the front surface 3203 of the rear frame 32 is conducted by fixing, through heat fusing or the like, in the condition where the longitudinal diretion of the connection wall 3002 is set parallel to the slit 3208 in the rear frame 32 at a portion on the lower side of the slit 3208 and the connection wall 3002 is laid on the front surface 3203 of the rear frame 32.

As shown in FIGS. 5 and 9, in the condition where the guide member 30 is attached to the rear frame 32, each of the guide walls 3004 extends vertically while projecting forwards.

As shown in FIGS. 5 and 9, an upper side guide surface 3006 located at an upper portion and a lower side guide surface 3008 located at a lower portion are formed at the front end where the guide wall 3004 fronts on the front side, and a projection 3005 is formed between the upper side guide surface 3006 and the lower side guide surface 3008.

The upper side guide surface 3006 is composed of a circular arc-shaped curved surface forwardly protuberant and located gradually to the front side as one goes downwards, as viewed from a lateral side.

The lower side guide surface 3008 is composed of a slant surface rearwardly inclined as one goes from an upper portion toward the lower portion, as viewed from a lateral side, and a surface extending in parallel to the rear wall surface 3202 from the lower end of the slant surface.

The projection 3005 is formed to project forwards at a boundary portion between the upper side guide surface 3006 and the lower side guide surface 3008.

A projection 3010 for locking one end of a first toggle spring 36 (see FIGS. 12 and 13) is projectingly provided at a portion faced to the outside of each of the guide walls 3004.

As shown in FIG. 6, the front frame 24 has a profile elongate in the left-right direction which conforms to the rear frame 32, and the front frame 24 has four wall portions 2402 conforming to the four wall portions 3204 of the rear frame 32.

Front surface walls 2406 are provided at both left and right side portions of the front ends of the four wall portions 2402, and an opening 2404 is provided between the upper and lower wall portions 2402 and the left and right front surface walls 2406.

Bulged walls 2407 bulged spherically to the front side are provided at portions near the opening 2404 of the left and right front surface walls 2406, and mount seats 2409 are formed projectingly to the rear side from back surfaces of the bulged portions 2407.

As shown in FIG. 9, the front frame 24 is mounted to the rear frame 32 by screws passed through screw insertion holes 3205 and attached to the mount seats 2409 in the condition where the rear ends of the wall portions 2402 are abutted on the front ends of the wall portions 3204 of the rear frame 32, whereby the front frame 24 is integrated with the rear frame 32.

At an edge portion of the bulged wall 2407 extending vertically while fronting on the opening 2404, a guide wall 2408 projecting rearwards is formed extending vertically.

At rear ends where the guide wall 2408 fronts on the rear side, an upper side guide surface 2410 located at an upper portion and a lower side guide surface 2412 located at a lower portion are formed.

The upper side guide surface 2410 is composed of a circular arc-shaped curved surface forwardly protuberant and located gradually on the front side as one goes downwards, as viewed from a lateral side.

The lower side guide surface 2412 is composed of a slant surface inclined to the rear side as one goes from an upper portion toward a lower portion, as viewed from a lateral side, and a surface extending in parallel to the front surface wall 2406 from the lower end of the slant surface.

In addition, a recessed portion 2413 for engagement with the projection 3005 is formed between the upper side guide surface 2410 and the lower side guide surface 2412.

As shown in FIG. 9, in the condition where the front frame 24 and the rear frame 32 are mounted to each other, the projection 3005 is engaged with the recessed portion 2413, a first guide groove 34A extending in a circular arc shape between the upper side guide surface 2410 of the front frame 24 and the upper side guide surface 3006 of the guide member 30 is formed, and a second guide groove 34B extending in a bent line shape between the lower side guide surface 2412 of the front frame 24 and the lower side guide surface 3008 of the guide member 30 is formed.

Besides, in the condition where the front frame 24 and the rear frame 32 are mounted to each other, a containing space S1 is formed between the left and right side front surface walls 2406 of the front frame 24 and the rear surface walls 3202 of the rear frame 32, and the first guide groove 34A and the second guide groove 34B are contained in the containing space S1.

As shown in FIG. 7A, the upper member 26 has an upper panel portion 2602 elongate in the left-right direction and so sized as to be vertically movable in the opening 2404 formed in the front frame 24.

As shown in FIG. 2, the upper panel portion 2602 is formed in a rectangular shape elongate in the left-right direction, i.e., having a width in the left-right direction greater than the vertical height. The upper panel portion 2602 has a front surface 2603 directed to the front side in the condition where the upper member 26 is mounted in the opening 2404, and the front surface 2603 is composed of a cylindrical surface protuberant to the front side which conforms to the edges of the bulged wall 2407.

At a portion near each of the left and right sides of the front surface 2603, two operating switches 120 are provided at a vertical interval therebetween.

As shown in FIGS. 7A and 7B, in this example, a printed substrate 2608 is mounted on the rear side of the upper panel portion 2602, the display 118 (see FIG. 1) is mounted on the front surface of the printed substrate 2608, the upper panel portion 2602 is provided with an opening 2609 elongate in the left-right direction, the display surface 118A of the display 118 is so disposed as to front on the opening 2609, and a transparent plate 2611 formed of a transparent synthetic resin or the like is attached to roughly the whole area of the front surface 2603 including the opening 2609. In other words, the display surface 118A of the display 118 is provided at the front surface 2603 of the upper panel portion 2602.

Further, an electronic part 2612 which includes an LSI and the like constituting an electric circuit for driving the display 118 and generating operation signals inputted from the operating switches 120 and a connector 2614 to which a flexible substrate (not shown) connected to the control circuit 116 is connected are mounted on the rear surface of the printed substrate 2608, so as to ensure that drive signals from the control circuit 116 are supplied to the display 118 through the flexible substrate, the connector 2614 and the electric circuit, and the operation signals inputted from the operating switches 120 are transmitted to the control circuit 116 through the electric circuit, the connector 2614 and the flexible substrate.

An upper wall 2604 is formed projecting rearwards from the upper edge of the upper panel portion 2602, a lower wall 2605 is formed projecting rearwards from the lower edge of the upper panel portion 2602, and side walls 2606 are formed projecting rearwards from both left and right sides of the upper panel portion 2602.

The left and right side walls 2606 have upper side walls 2606A projecting rearwards from both left and right ends exclusive of a lower portion of the upper panel portion 2602, lower side walls 2606B projecting rearwards from portions deviated to the inside in the width direction at lower portions of the upper panel portion 2602, and connection walls 2606C each connecting between the upper side wall 2606A and the lower side wall 2606B. A recessed portion 2620 hollowed to the inside in the width direction of the upper panel portion 2602 is defined by the lower side wall 2606B and the connection wall 2606C at each of both left and right side lower portions of the back surface where the upper panel portion 2602 is directed to the rear side.

At the rear ends of the left and right upper side walls 2606A, arcuate projected portions 2616 protuberant to the front side and extending vertically are projectingly formed, and at a portion near a lower portion of each of the projected portions 2616, a projection 2618 to which to lock the other end of the first toggle spring 36 (see FIGS. 12 and 13) is projected sideways.

On each of the left and right lower side walls 2606B, a support shaft 2622 for connection of the lower member is projected sideways.

Besides, on a lower portion of each of the left and right lower side walls 2606B, a projection 2624 to which to lock one end of the second toggle spring 38 (see FIG. 14) is projected.

The upper member 26 is mounted into the front frame 24 and the rear frame 32 by the insertion of its projected portions 2616 respectively into the first guide grooves 34A in the condition where its width direction conforms to the width direction of the opening 2404 formed in the front frame 24, and the upper member 26 can be moved vertically within the opening 2404 by vertical guiding of the projected portions 2616 along the first guide grooves 34A.

To be more specific, the upper member 26 is moved vertically between an upper position for closing the recording medium insertion slit 14 with the upper panel portion 2602 and a lower position for opening the recording medium insertion slit 14.

Incidentally, when the upper member 26 is located in the upper position, the upper edge (the upper wall 2604) of the upper panel portion 2602 closely fronts on the wall portion 2402 located on the upper side of the front frame 24.

Besides, as shown in FIGS. 12 and 13, in the case where the upper member 26 is located in the vicinity of the upper position, the first toggle springs 36 bias the upper panel portion 26 toward the upper position, and in the case where the upper member 26 is located in the vicinity of the lower position, the first toggle springs 36 bias the upper panel portion 26 toward the lower position. In this example, the first toggle springs 36 and the projections 2618 and 3010 constitute a first toggle mechanism as set forth in the claims.

Besides, in this example, the projected portion 2616 constitutes a first support guide portion as set forth in the claims, the first guide groove 34A constitutes a second support guide portion as set forth in the claims, and the first guide groove 34A constitute a support mechanism as set forth in the claims.

As shown in FIG. 8, the lower member 28 has a lower panel portion 2802 being connected swingably around a support shaft 2622 of the upper member 26, being elongate in the left-right direction, and being so sized as to be disposed on the lower side of the upper panel portion 2602 within the opening 2404 of the front frame 24.

The lower panel portion 2802 is formed in a rectangular shape elongate in the left-right direction, i.e., with a width in the left-right direction greater than the vertical height, and the vertical height of the lower panel portion 2802 is smaller than that of the upper panel portion 2602.

As shown in FIG. 2, the lower panel portion 2802 has a front surface 2803 directed to the front side in the condition where the lower member 28 is mounted in the opening 2404, and the front surface 2803 is composed of a curved surface hollowed to the rear side.

A plurality of operating switches 120 (operating keys) of the on-vehicle electronic apparatus 100 are arrayed in the left-right direction at the front surface 2803, and the front surface 2803 is formed to be a curved surface hollowed to the rear side so that the operating switches 120 can be operated easily.

The plurality of operating switches 120 are connected to the control circuit 116 of the upper member 26 through a wiring member (e.g., a flexible substrate) (not shown), and operation signals from the plurality of operating switches 120 are transmitted to the control circuit 116 through the wiring member, the electric circuit, the connector 2614 and the flexible substrate, in the same manner as in the case of the operating switches 120 of the upper member 26.

Arms 2806 projecting to the rear side are provided on both left and right sides of the lower panel portion 2802.

The arm 2806 includes a first arm portion 2808 extending rearwards from the lower panel portion 2802, a second arm portion 2810 extending upwards from the rear end of the first arm portion 2808, and a third arm portion 2812 extending forwards from the upper end of the second arm portion 2810 so as to define a forwardly opened panel portion containing groove 2814 between itself and the first arm portion 2808.

Besides, the third arm 2812 is provided in its front portion with a bearing hole 2816 to which the support shaft 2622 of the upper member 26 is swingably connected.

In addition, at a portion on the outside in the width direction of a front portion of the third arm portion 2812, a projected portion 2818 is provided projecting to the outside in the left-right direction, and, at a portion on the inside in the width direction of the front portion of the third arm portion 2812, a projection 2820 to which the other end of the second toggle spring 38 (see FIG. 14) is to be locked is projected.

In this example, an upper surface 2822 is formed to the rear side from the upper edge of the front surface 2803 of the lower panel portion 2802 so as to connect between the upper edges of the left and right first arm portions 2808, and a lower surface 2824 is formed to the rear side from the lower edge of the front surface 2803 of the lower panel portion 2802 so as to connect between the lower edges of the left and right first arm portions 2808.

As shown in FIGS. 10 and 11, the connection between the upper member 26 and the lower member 28 is made by the containing of the left and right third arm portions 2812 in the recessed portions 2620 and the rotatable connection of the support shaft 2622 in the bearing holes 2816. In other words, the connection is made through the process in which the front portions of the third arm portions 2812 are connected to the portions of the upper member 26 on the lower rear side of the upper panel portion 2602 swingably about the axis extending in the left-right direction. With the upper member 26 and the lower member 28 thus connected, the outside surfaces of the left and right upper side walls 2606A of the upper member 26 and the left and right side surfaces of the lower panel portion 2802 of the lower member 28 and the side surfaces of the arms 2806 are located on substantially the same plane.

The lower member 28 is swung in the front-rear direction about the support shaft 2622 by the guiding of the projected portions 2818 in the front-rear direction along the second guide grooves 34B according to the vertical movement of the upper member 26.

To be more specific, as shown in FIGS. 2A, 10 and 12, the lower member 28 is so formed that, when the upper panel member 2602 is located in the upper position, the lower member 28 is set in the erected position such that the upper end of the front surface 2803 of the lower panel portion 2802 extends downwards continuously from the lower end of the front surface 2603 of the upper panel portion 2602, and the front surfaces 2803 and 2603 extend in the left-right direction so as to close the opening 2404.

Besides, as shown in FIGS. 2B, 11 and 13, the lower member 28 is so formed that, when the upper panel portion 2602 is located in the lower position, the lower member 28 is set in the slant position such that the lower ends of both left and right ends of the upper panel portion 2602 are contained in the panel portion containing grooves 2814, the upper end of the lower panel portion 2802 is located on the front side of the lower portion of the upper panel portion 2602, and the front surface 2803 of the lower panel portion 2802 is directed slantly upwards. In this example, the lower panel portion 2802 is so formed that, when it is in the slant position, its upper end is located on the lower and front side of the display surface 118A of the display 118 provided at the front surface 2603 of the upper panel portion 2602.

In addition, in the case where the lower member 28 is in the vicinity of the erected position, the second toggle springs 38 bias the lower panel member 2802 toward the erected position, and, in the case where the lower member 28 is in the vicinity of the slant position, the second toggle spring 38 bias the lower panel portion 2802 toward the slant position. In this example, the second toggle springs 38 and the projections 2624 and 2820 constitute a second toggle mechanism as set forth in the claims.

Incidentally, in this example, the projections 2818 of the lower member 28 constitute a first conjunction guide portion as set forth in the claims, the second guide grooves 34B constitute a second conjunction guide portion as set forth in the claims, and the second guide grooves 34B constitute a conjunction mechanism as set forth in the claims.

In addition, the upper member 26 is included within the profile of the front surface 1202 of the housing body 12 as viewed from the front side of the housing 10 both when being in the upper position and when being in the lower position, and the lower member 28 is included within the profile of the front surface 1202 of the housing body 12 as viewed from the front side of the housing 10 both when being in the erected position and when being in the slant position.

Now, the operations of the front panel assembly 20 attached to the front surface 1202 of the housing body 12 will be described below. Incidentally, symbol 200 in FIGS. 14 to 18 denotes a dashboard of the automobile to which the on-vehicle electronic apparatus 100 is mounted.

First, the case where the recording medium insertion slit 14 is closed will be described.

As shown in FIG. 14A, in the condition where the upper panel portion 2602 is located in the upper position and the lower panel portion 2802 is set in the erected position, the recording medium insertion slit 14 is closed with the upper panel portion 2602. In this condition, the opening 2404 is closed with the front surface 2603 of the upper panel portion 2602 and the front surface 2803 of the lower panel portion

2802, and the closed condition is maintained by the first toggle mechanism and the second toggle mechanism.

In this condition, the display surface 118A of the display 118 is directed to the front side, so that the display surface 118A can be visually checked, and, since the front surface 2803 of the lower panel portion 2802 is directed substantially to the front side, the operating switches 120 can be operated. Therefore, the user can operate the operating switches 120 and use the car audio system while visually checking the display surface 118A.

Now, the case of opening the recording medium insertion slit 14 will be described below.

When a finger is put on the front surface 2603 of the upper panel portion 2602 and the front surface 2603 is pushed downwards, the upper member 26 is moved downwards by the guiding of the projected portions 2616 along the first guide grooves 34A, and the lower member 28 is swung to the front side about the support shaft 2622 by the guiding of the projected portions 2818 along the second guide grooves 34B according to the vertical movement of the upper member 26, as shown in FIG. 14B.

Thereafter, through the process as shown in FIGS. 15A to 18B, the upper panel portion 2602 is moved toward the lower position, and the lower panel portion 2802 is swung to the front side toward the slant position.

When the lower portion of the upper panel portion 2602 is contained into the panel portion containing groove 2814 and the upper panel portion 2602 reaches the lower position and the lower panel portion 2802 reaches the slant position, as shown in FIG. 18A, the space between the opening 2404 and the upper wall 2604 of the upper panel portion 2602 is enlarged, and the recording medium insertion slit 14 is opened, resulting in the condition where the recording medium can be inserted and be removed. The condition where the recording medium insertion slit 14 is thus opened is maintained by the first toggle mechanism and the second toggle mechanism.

In this condition, the display surface 118A of the display 118 fronts on the front side though it is directed slightly to the slant lower side, which causes no trouble to visual checking of the display surface 118A; besides, since the front surface 2803 of the lower panel portion 2802 fronts on the front side though it is directed slightly to the slant upper side, the operating switches 120 can be operated. Therefore, even in the condition where the recording medium insertion slit 14 is opened, the user can operate the operating switches 120 and use the car audio system while visually checking the display surface 118A.

In addition, as shown in FIGS. 14A and 18A, the upper member 26 is included within the profile of the front surface 1202 of the housing body 12 as viewed from the front side of the housing 10 both when being in the upper position and when being in the lower position, and the lower member 28 is also included within the profile of the front surface 1202 of the housing body 12 as viewed from the front side of the housing 10 both when being in the erected position and when being in the slant position, so that neither the upper member 26 nor the lower member 28 interferes with the portions of the dashboard 200. Therefore, the on-vehicle electronic apparatus 100 can be laid out without consuming a considerable space.

Now, the case of closing the opened recording medium insertion slit 14 will be described below.

As shown in FIG. 18B, when a finger is put on the front surface 2603 of the upper panel portion 2602 and the front surface 2603 is pulled up, the upper panel portion 2602 is moved upwards, and the lower panel portion 2802 is swung to the erected position, through the process as shown in FIGS. 18A to 14B.

When the upper panel portion 2602 reaches the upper position and the lower panel portion 2802 reaches the erected position, as shown in FIG. 14A, the recording medium insertion slit 14 is closed by the upper panel portion 2602, the opening 2404 is closed by the upper panel portion 2602 and the lower panel portion 2802.

According to this example, the simple configuration is adopted in which the upper member 26 is supported in a vertically movable manner by the support mechanism, and the lower member 28 is swung in the front-rear direction according to the vertical movement of the upper member 26 by the conjunction mechanism. Therefore, as contrasted to the related art in which an open/close lid is drawn into the inside of a housing, it is unnecessary to provide a complicated mechanism such as a motive power source and a transmission mechanism for drawing in the open/close lid, which is advantageous in reducing the cost.

In addition, since the display surface 118A of the display 118 and the front surface 2803 of the lower panel portion 2802 are both fronting on the front side in the condition where the recording medium insertion slit 14 is opened, it is possible to operate the operating switches 120 while visually checking the display surface 118A of the display 118, and it is possible to use the car audio system even in the condition where the recording medium insertion slit 14 is opened. In the related art in which an open/close lid for opening and closing the recording medium insertion slit is provided, the operating switches and the display are provided on the open/close lid and the open/close lid is so supported as to be swingable about a support shaft, or in the related art in which a mechanism for drawing the opened open/close lid into the inside of the housing is further provided, there has been the problem that the open/close lid is swung and tilted down or is drawn into the housing in the condition where the recording medium insertion slit is opened. Therefore, it is impossible to operate the operating switches or to visually check the display. This problem can be solved according to this example of the present invention.

Besides, since the upper member 26 and the lower member 28 are both moved in the state of being contained in the profile of the front surface 1202 of the housing body 12, there is less limitation as to the shapes of the upper panel portion 2602 and the lower panel portion 2802, which is advantageous in securing the degree of freedom in designing and in design, as compared with the related art in which the open/close lid is swung.

Here, the operations of lock claws 3212 and the engaging/disengaging mechanism 18 at the time of attaching or detaching the front panel assembly 20 to or from the front surface 1202 of the housing body 12 will be described.

As shown in FIGS. 19 and 20, the engaging/disengaging mechanism 18 has a bracket 1802 fixed to the housing body 12, and a release lever 1804 supported to be swingable in the left-right direction about a support shaft 1808 relative to the bracket 1802, and the release lever 1804 is normally biased by a spring 1820 in the direction for closing.

As shown in FIGS. 21 and 22A and 22B, a slide member 1806 is supported on the bracket 1802 so as to be slidable in the front-rear direction, and, as shown in FIGS. 23A and 23B, the slide member 1802 is normally biased by a spring 1822 in the direction for protruding from the front surface 1202 of the housing body 12.

As shown in FIGS. 22A and 22B, the slide member 1802 is provided with a fixed claw 1807 and a movable claw 1808 swingable vertically, with a vertical interval therebetween, and the movable claw 1808 is normally biased by a spring 1824 in the direction for closing.

At the time of mounting the front panel assembly 20 to the front surface 1202 of the housing body 12, the rear surface 3206 of the rear frame 32 is brought close to the front surface 1202 of the housing body 12, the projected portions 1206 (see FIG. 3) and the recessed portions 3214 (see FIG. 4B) are engaged with each other, the housing body side connector 16 and the panel assembly side connector are connected to each other, and the lock claws 3212 are engaged with the fixed claw 1807 and the movable claw 1808. By this, first, the movable claw 1808 is once opened against the biasing force of the spring 1824 and then closed in engagement with the lock claw 3212, and the upper and lower lock claws 3212 are engaged with the fixed claw 1807 and the movable claw 1808.

When the front panel assembly 20 is further abutted against the front surface 1202 of the housing body 12, the slide member 1806 is retracted on the bracket 1802. The release lever 1804 is once opened attendant on the retraction of the slide member 1806, and an engaging portion 1804A of the release lever 1804 is locked on a front surface 1806A of the slide member 1806 at the retracted position of the slide member 1806. Then, the retracted position of the slide member 1806 is maintained. At the retracted position of the slide member 1806, the movable claw 1808 abuts on an upper wall 1802B of the bracket 1802, and it is prevented from disengaging from the lock claw 3212. As a result, the front panel assembly 20 is mounted to the front surface 1202 of the housing body 12.

At the time of detaching the front panel assembly 20 from the front surface 1202 of the housing body 12, a release button 2002 (see FIGS. 2A and 2B) provided at the front frame 24 is depressed. By this, the release lever 1804 is pushed by the tip end of the release button 2002, the release lever 1804 is opened, the slide member 1806 is moved forwards by the biasing force of the spring 1822, and the portions of the fixed claw 1807 and the movable claw 1808 are located on the front side of the front surface 1202 of the housing body 12. In this instance, the user opens the movable claw 1808, cancels the engagement of the lock claws 3212 with the fixed claw 1807 and the movable claw 1808, and detaches the front panel assembly 20 from the front surface 1202 of the housing body 12.

Incidentally, the configuration of the engaging/disengagihg mechanism for engagement and disengagement of the front panel assembly 20 with and from the front surface 1202 of the housing body 12 is not limited to the above-described configuration, and various configurations hitherto known can be adopted. With such an engaging/disengaging mechanism 18 provided, the user can detach the front panel assembly 20 from the housing body 12 according to the environment in which the vehicle is left to stand.

Incidentally, while the case where the front panel assembly is detachably attached to the front surface of the housing body has been described in the above example, the present invention naturally is applicable also to a housing for an electronic apparatus in which the front panel assembly is integrated with the front surface of the housing body. In this case, the present invention pertains to a housing for an on-vehicle electronic apparatus, including a housing body having a front surface elongate in the left-right direction and a recording medium insertion slit extending in the left-right direction at an upper portion of the front surface, and a panel provided at the front surface of the housing body so as to openably close the recording medium insertion slit; wherein the panel has an upper member and a lower member; the upper member has an upper panel portion elongate in the left-right direction; the lower member has a lower panel portion being connected to a lower portion of the upper member so as to be swingable about an axis extending in the left-right direction, being elongate in the left-right direction, and being disposed on the lower side of the upper panel portion; a support mechanism which supports the upper member so as to be movable in a substantially vertical direction and which moves the upper panel portion between an upper position for closing the recording medium insertion slit and a lower position for opening the recording medium insertion slit is provided at a front surface of the housing body; and a conjunction mechanism for ensuring that the lower member is swung in the front-rear direction about the axis according to the vertical movement of the upper member, the lower panel portion is set in an erected position for extending downwards continuously from the lower end of the upper panel portion when the upper panel portion is located in the upper position, and the lower panel portion is set in a slant position for being directed slantly upwards, with its upper end located on the front side of a lower portion of the upper panel portion, when the upper panel portion is located in the lower position is provided at the front surface of the housing body.

In addition, while the configuration in which the upper member 26 is moved vertically whereas the lower member 28 is swung in the front-rear direction has been adopted in the above example, a configuration may be adopted in which the upper member is swung in the front-rear direction whereas the lower member 28 is moved vertically.

In this case, the present invention pertains to a housing for an on-vehicle electronic apparatus, including a housing body having a front surface elongate in the left-right direction and a recording medium insertion slit extending in the left-right direction at an upper portion of the front surface, and a front panel assembly detachably attached to the front surface of the housing body so as to openably close the recording medium insertion slit; wherein the front panel assembly has a panel frame detachably attached to the front surface of the housing body, and an upper member and a lower member which are attached to the panel frame; the lower member has a lower panel portion elongate in the left-right direction; the upper member has an upper panel portion being connected to an upper portion of the lower member so as to be swingable about an axis extending in the left-right direction, being elongate in the left-right direction, and being disposed on the upper side of the lower panel portion; the panel frame is provided with a support mechanism which supports the lower member movably in a substantially vertical direction and which moves the lower panel portion between a lower position for closing the recording medium insertion slit and an upper position for opening the recording medium insertion slit; and the panel frame is provided with a conjunction mechanism for ensuring that the upper member is swung in the front-rear direction about the axis according to the vertical movement of the lower member, the upper panel portion is set in an erected position for extending upwards continuously from the upper end of the lower panel portion when the lower panel portion is in the lower position, and the upper panel portion is set in a slant position for being directed slantly downwards, with its lower end located on the front side of an upper portion of the lower panel portion, when the lower panel portion is in the upper position.

Besides, in this case, the present invention pertains to a housing for an on-vehicle electronic apparatus, including a housing body having a front surface elongate in the left-right direction and a recording medium insertion slit extending in the left-right direction at an lower portion of the front surface, and a panel provided at the front surface of the housing body so as to openably close the recording medium insertion slit; wherein the panel has an upper member and a lower member; the lower member has a lower panel portion elongate in the left-right direction; the upper member has an upper panel portion being connected to an upper portion of the lower member so as to be swingable about an axis extending in the left-right direction, being elongate in the left-right direction, and being disposed on the upper side of the lower panel portion; a support mechanism which supports the lower member movably in a substantially vertical direction and which moves the lower panel portion between a lower position for closing the recording medium insertion slit and an upper position for opening the recording medium insertion slit is provided at the front surface of the housing body; and a conjunction mechanism for ensuring that the upper member is swung in the front-rear direction about the axis according to the vertical movement of the lower member, the upper panel portion is set in an erected position for extending upwards continuously from the upper end of the lower panel portion when the lower panel portion is in the lower position, and the upper panel portion is set in a slant position for being directed slantly downwards, with its lower end located on the front side of an upper portion of the lower panel portion, when the lower panel portion is in the upper position is provided at the front surface of the housing body.

Incidentally, while the recording medium insertion slit has been for insertion of an optical disk which is a disk form recording medium in the above example, the recording medium insertion slit is not limited to the one for insertion of the optical disk, and may be one for insertion of other recording medium such as a memory card.

Besides, the case where the on-vehicle electronic apparatus is a car audio system has been described in the above example, the on-vehicle electronic apparatus is not limited to the car audio system but may be, for example, a car navigation system.

It should be understood by those skilled in the art that various modifications, combinations, sub-combinations and alterations may occur depending on design requirements and other factors insofar as they are within the scope of the appended claims or the equivalents thereof.

What is claimed is:

1. A housing for an on-vehicle electronic apparatus, comprising a housing body having a front surface elongate in the left-right direction and a recording medium insertion slit extending in the left-right direction at an upper portion of said front surface, and a front panel assembly detachably attached to said front surface of said housing body so as to openably close said recording medium insertion slit; wherein
said front panel assembly has a panel frame detachably attached to said front surface of said housing body, and an upper member and a lower member which are attached to said panel frame;
said upper member has an upper panel portion elongate in the left-right direction;
said lower member has a lower panel portion being connected to a lower portion of said upper member so as to be swingable about an axis extending in the left-right direction, being elongate in the left-right direction, and being disposed on the lower side of said upper panel portion;
said panel frame is provided with a support mechanism which supports said upper member movably in a substantially vertical direction and which moves said upper panel portion between an upper position for closing said recording medium insertion slit and a lower position for opening said recording medium insertion slit; and
said panel frame is provided with a conjunction mechanism for ensuring that said lower member is swung in the front-rear direction about said axis according to the vertical movement of said upper member, said lower panel portion is set in an erected position for extending downwards continuously from the lower end of said upper panel portion when said upper panel portion is in said upper position, and said lower panel portion is set in a slant position for being directed slantly upwards, with its upper end located on the front side of a lower portion of said upper panel portion, when said upper panel portion is in said lower position.

2. A housing for an on-vehicle electronic apparatus as set forth in claim 1, wherein both said upper panel portion and said lower panel portion have a rectangular shape elongate in the left-right direction, and the vertical height of said upper panel portion is greater than that of said lower panel portion.

3. A housing for an on-vehicle electronic apparatus as set forth in claim 1, wherein said support mechanisms are provided to front respectively on both ends of said upper member in the left-right direction, said upper member is provided with first support guide portions respectively at both ends thereof, and said support mechanism has a second support guide portion for guiding said upper member in a substantially vertical direction by engaging with said first support guide portion.

4. A housing for an on-vehicle electronic apparatus as set forth in claim 1, wherein said support mechanisms are provided to front respectively on both ends of said upper member along the longitudinal direction of said upper panel portion, said upper member is provided with first support guide portions respectively at both ends thereof, and said support mechanism has a second support guide portion for guiding said upper member in a substantially vertical direction along a forwardly convex circular arc by engaging with said first support guide portion.

5. A housing for an on-vehicle electronic apparatus as set forth in claim 1, wherein said support mechanisms are provided to front respectively on both ends of said upper member along the longitudinal direction of said upper panel portion, said upper member is provided with first support guide portions respectively at both ends thereof, said support mechanism has a second support guide portion for guiding said upper member in a substantially vertical direction along a forwardly convex circular arc by engaging with said first support guide portion, said upper panel portion has a front surface directed toward the front side of said casing, and said front surface is formed of a cylindrical surface being forwardly convex and having substantially the same radius as said circular arc.

6. A housing for an on-vehicle electronic apparatus as set forth in claim 3, wherein said first support guide portions are comprised of projected portions projected outwards in the left-right direction respectively from both ends of said upper member, and said second support guide portion is comprised of a guide groove capable of engaging with said projected portion.

7. A housing for an on-vehicle electronic apparatus as set forth in claim 1, wherein said upper panel portion and said lower panel portion respectively have front surfaces directed toward the front side of said front panel assembly, a display surface of a display for displaying the operating condition of said on-vehicle electronic apparatus is provided at said front surface of said upper panel portion, and operating keys of said on-vehicle electronic apparatus are provided at said front surface of said lower panel portion.

8. A housing for an on-vehicle electronic apparatus as set forth in claim 7, wherein said front surface of said lower panel portion is comprised of a curved surface hollowed rearwards.

9. A housing for an on-vehicle electronic apparatus as set forth in claim 1, wherein said upper panel portion and said lower panel portion respectively have front surfaces directed toward the front side of said front panel assembly, a display surface of a display for displaying the operating condition of said on-vehicle electronic apparatus is provided at said front surface of said upper panel portion, operating keys of said on-vehicle electronic apparatus are provided at said front surface of said lower panel portion, said recording medium insertion slit is closed with an upper portion of said upper panel portion at said upper position and exposed to the upper side of an upper edge of said upper panel portion at said lower position, and said front surface of said lower panel portion extends downwards continuously from the lower end of said front surface of said upper panel portion when being in said erected position and is directed slantly upwards, with its upper end located on the lower and front side of said display surface of said display at said front surface of said upper panel portion, when being in said slant position.

10. A housing for an on-vehicle electronic apparatus as set forth in claim 1, wherein said upper panel portion has a front surface directed toward the front side of said front panel assembly, said lower panel portion has a front surface directed toward the front side of said front panel assembly and a back surface directed toward said housing body, a display surface of a display for displaying the operating condition of said on-vehicle electronic apparatus is provided at said front surface of said upper panel portion, operating keys of said on-vehicle electronic apparatus are provided at said front surface of said lower panel portion, said lower panel portion is provided with an arm projecting toward the rear side, said arm includes a first arm portion extending rearwards from said lower panel portion, a second arm portion extending upwards from the rear end of said first arm portion, and a third arm portion extending forwards from the upper end of said second arm portion and defining between itself and said first arm a panel portion containing groove opened to the front side, the connection between said upper panel portion and said lower panel portion is made by connection of a front portion of said third arm portion to a portion of said upper member on the rear side of a lower portion of said upper panel portion so as to be swingable about said axis extending in the left-right direction, and a lower portion of said upper panel portion is contained in said panel portion containing groove when said upper panel portion is in said lower position.

11. A housing for an on-vehicle electronic apparatus as set forth in claim 1, wherein said conjunction mechanisms are provided to front respectively on both ends of said lower member along the longitudinal direction of said lower panel portion, first conjunction guide portions are provided respectively at both ends of said lower member, and said conjunction guide portion includes a second conjunction guide portion for swinging said lower member in the front-rear direction about said axis by engaging with said first conjunction guide portion.

12. A housing for an on-vehicle electronic apparatus as set forth in claim 11, wherein said first conjunction guide portion is comprised of projected portions projected outwards in the left-right direction respectively from both ends of said lower member, and said second conjunction guide portion is comprised of guide grooves engableable with said projected portion.

13. A housing for an on-vehicle electronic apparatus as set forth in claim 1, wherein said front panel assembly includes a first toggle mechanism for biasing said upper panel portion toward said upper position when being in the vicinity of said upper position and for biasing said upper panel portion toward said lower position when being in the vicinity of said lower position.

14. A housing for an on-vehicle electronic apparatus as set forth in claim 1, wherein said front panel assembly includes a second toggle mechanism for biasing said lower panel portion toward said erected position when being in the vicinity of said erected position and for biasing said lower panel portion toward said slant position when being in the vicinity of said slant position.

15. A housing for an on-vehicle electronic apparatus as set forth in claim 1, wherein said upper member is included within the profile of said front surface of said housing body as viewed from the front side of said housing both when being in said upper position and when being in said lower position, and said lower member is included within the profile of said front surface of said housing body as viewed from the front side of said housing both when being in said erected position and when being in said slant position.

16. A housing for an on-vehicle electronic apparatus as set forth in claim 1, said panel frame has a rear frame detachably attached to said front surface of said housing body, and a front frame attached to a front portion of said rear frame, said rear frame is provided in an upper portion thereof with a slit communicated with said recording medium insertion slit, said front frame has an opening in which to dispose said upper panel portion and said lower panel portion, and left and right side front surface portions fronting on the front side of said housing respectively on the left and right sides of said opening, and a containing space in which to contain said support mechanisms and said conjunction mechanisms is provided between said left and right front surface portions of said front frame and said rear frame.

17. A housing for an on-vehicle electronic apparatus as set forth in claim 1, said panel frame has a rear frame detachably attached to said front surface of said housing body, and a front frame attached to a front portion of said rear frame, said rear frame is provided in an upper portion thereof with a slit communicated with said recording medium insertion slit, said front frame has an opening in which to dispose said upper panel portion and said lower panel portion, and left and right side front surface portions fronting on the front side of said housing respectively on the left and right sides of said opening, a guide wall extending vertically while projecting rearwards from the back surfaces of said left and right side front surface portions, said rear frame is provided with a guide wall extending vertically while projecting forwards so as to front on the rear end of said wall portion, said support mechanisms are provided to front respectively on both sides of said upper member along the longitudinal direction of said upper panel portion, said upper member is provided at both ends thereof with projected portions respectively projected outwards in the left-right direction, said support mechanisms are comprised of guide grooves for guiding said upper member in a substantially vertical direction by engaging with said projected portions, said conjunction mechanisms are provided to front respectively on both ends of said lower member along the longitudinal direction of said lower member, said lower member is provided at both ends thereof with projected portions respectively projected outwards in the left-right direction, said conjunction mechanism are comprised of guide grooves for swinging said lower member in the front-rear direction about said axis by engaging with said projected portions, and said guide grooves constituting said support mechanisms and said guide grooves constituting said conjunction mechanisms are formed between the rear end of said guide wall projecting rearwards from the back surfaces of said left and right side front surface portions and the front end of said guide wall projecting forwards from said rear frame.

18. A housing for an on-vehicle electronic apparatus as set forth in claim 1, wherein said upper panel portion and said lower panel portion respectively have front surfaces directed toward the front side of said front panel assembly, a display surface of a display for displaying the operating condition of said on-vehicle electronic apparatus is provided at a front surface of said upper panel portion, operating keys of said on-vehicle electronic apparatus are provided at a front surface of said lower panel portion, said panel frame is detachably attached to said front surface of said housing body, an engaging/disengaging mechanism and a housing body side connector connected to an electric circuit contained in said housing body are provided at said front surface of said housing body, and said panel frame is provided with an engaging claw for disengageable engagement with said engaging/disengaging mechanism and with a panel assembly side connector detachably connected to said housing body side connector so as to transfer electrical signals between said electric circuit and said front panel assembly through said housing body side connector.

19. A housing for an on-vehicle electronic apparatus, comprising a housing body having a front surface elongate in the left-right direction and a recording medium insertion slit extending in the left-right direction at an upper portion of said front surface, and a panel provided at said front surface of said housing body so as to openably close said recording medium insertion slit; wherein said panel has an upper member and a lower member;
said upper member has an upper panel portion elongate in the left-right direction;
said lower member has a lower panel portion being connected to a lower portion of said upper member so as to be swingable about an axis extending in the left-right direction, being elongate in the left-right direction, and being disposed on the lower side of said upper panel portion;
a support mechanism which supports said upper member so as to be movable in a substantially vertical direction and which moves said upper panel portion between an upper position for closing said recording medium insertion slit and a lower position for opening said recording medium insertion slit is provided at a front surface of said housing body; and
a conjunction mechanism is provided at the front surface of said housing body, for ensuring that said lower member is swung in the front-rear direction about said axis according to the vertical movement of said upper member, said lower panel portion is set in an erected position for extending downwards continuously from the lower end of said upper panel portion when said upper panel portion is located in said upper position, and said lower panel portion is set in a slant position for being directed slantly upwards, with its upper end located on the front side of a lower portion of said upper panel portion, when said upper panel portion is located in said lower position.

20. A housing for an on-vehicle electronic apparatus, comprising a housing body having a front surface elongate in the left-right direction and a recording medium insertion slit extending in the left-right direction at a lower portion of said front surface, and a front panel assembly detachably attached to said front surface of said housing body so as to openably close said recording medium insertion slit; wherein said front panel assembly has a panel frame detachably attached to said front surface of said housing body, and an upper member and a lower member which are attached to said panel frame;
said lower member has a lower panel portion elongate in the front-rear direction;
said upper member has an upper panel portion being connected to an upper portion of said lower member so as to be swingable about an axis extending in the left-right direction, being elongate in the left-right direction, and being disposed on the upper side of said lower panel portion;
said panel frame is provided with a support mechanism which supports said lower member in a substantially vertical direction and which moves said lower panel portion between a lower position for closing said recording medium insertion slit and an upper position for opening said recording medium insertion slit; and
said panel frame is provided with conjunction mechanism for ensuring that said upper member is swung in the front-rear direction about said axis according to the vertical movement of said lower member, said upper panel portion is set in an erected position for extending upwards continuously from the upper end of said lower panel portion when said lower panel portion is located in said lower position, and said upper panel portion is set in a slant position for being directed slantly upwards, with its lower end located on the front side of an upper portion of said lower panel portion, when said lower panel portion is located in said upper position.

* * * * *